(12) United States Patent
Bretl et al.

(10) Patent No.: US 8,777,075 B2
(45) Date of Patent: Jul. 15, 2014

(54) COMBINATION HYDRATION, NUTRITION, AND PACK APPARATUS FOR A BICYCLE

(75) Inventors: Frank Joseph Bretl, Hood River, OR (US); Mark Matthew Proia, Portland, OR (US)

(73) Assignee: Velopass, LLC, Portland, OR (US)

( * ) Notice: Subject to any disclaimer, the term of this patent is extended or adjusted under 35 U.S.C. 154(b) by 1681 days.

(21) Appl. No.: 12/204,885

(22) Filed: Sep. 5, 2008

(65) Prior Publication Data

US 2010/0059564 A1   Mar. 11, 2010

(51) Int. Cl.
  *B65H 75/40*   (2006.01)
(52) U.S. Cl.
  USPC ................. 224/414; 224/162; 224/148.2
(58) Field of Classification Search
  USPC ........ 224/414, 162, 183, 148.1, 148.4, 148.5; 242/370, 379.2, 379, 373
  See application file for complete search history.

(56) References Cited

U.S. PATENT DOCUMENTS

| | | | | |
|---|---|---|---|---|
| 1,262,005 A | * | 4/1918 | Bell | 242/379.2 |
| 1,567,783 A | * | 12/1925 | Best | 242/376 |
| 2,732,148 A | * | 1/1956 | Lummis | 242/379.2 |
| 3,603,525 A | | 9/1971 | Pringle | |
| 3,995,787 A | | 12/1976 | Takada et al. | |
| 4,036,322 A | | 7/1977 | Takada | |
| 4,095,812 A | * | 6/1978 | Rowe | 280/288.4 |
| 4,274,566 A | | 6/1981 | Rowe | |
| 4,386,721 A | | 6/1983 | Shimano | |
| 4,441,638 A | | 4/1984 | Shimano | |
| 4,442,960 A | | 4/1984 | Vetter | |
| 4,526,298 A | | 7/1985 | Boxer | |
| 4,529,144 A | | 7/1985 | Fohl | |
| 4,629,040 A | | 12/1986 | Jones | |
| 5,026,274 A | * | 6/1991 | Jacob | 431/253 |
| 5,062,591 A | | 11/1991 | Runkel | |
| 5,127,563 A | | 7/1992 | Chan | |

(Continued)

FOREIGN PATENT DOCUMENTS

| | | |
|---|---|---|
| JP | 3000857 | 6/1994 |
| KR | 200429919 | 11/2006 |

OTHER PUBLICATIONS

Communication from the Korean Patent Office—Notification of Transmittal of the International Search Report and Written Opinion of the International Searching Authority, or the Declaration which was received in related PCT/US2010/037777 dated Jun. 3, 2011 (8 pages).

*Primary Examiner* — Justin Larson
*Assistant Examiner* — Lester L Vanterpool
(74) *Attorney, Agent, or Firm* — Ganz Law, P. C.

(57) ABSTRACT

The hydration pack apparatus for a bicyclist herein described includes a hydration fluid container that is removably mounted to a bicycle. Hydration fluid is transported from the container to the bicyclist via a flexible tube with one end connecting to an outlet on the container and the other end terminating at a bite actuated valve. The tube is routed on and mounted to the bicycle in a novel fashion. The cyclist, with the brief use of one hand, is able to easily access the bite valve and tube to retrieve hydration while continuing to ride the bicycle and maintaining a neutral and ergonomic posture. Retracting reel assemblies are used to automatically return and hold the tube in a stored position on the bicycle while not in use. The hydration pack can be equipped with additional features allowing for convenient storage and retrieval of nutrition supplements and for secure storage of other accessory items commonly employed by bicyclists.

20 Claims, 25 Drawing Sheets

(56) References Cited

U.S. PATENT DOCUMENTS

| | | | |
|---|---|---|---|
| 5,143,390 A * | 9/1992 | Goldsmith | 280/201 |
| 5,158,218 A | 10/1992 | Wery | |
| 5,201,442 A | 4/1993 | Bakalian | |
| 5,215,231 A * | 6/1993 | Paczonay | 222/610 |
| 5,301,858 A | 4/1994 | Hollander | |
| 5,326,124 A | 7/1994 | Allemang | |
| 5,358,142 A * | 10/1994 | Holmes | 222/1 |
| 5,388,877 A * | 2/1995 | Wenk | 294/219 |
| 5,474,270 A | 12/1995 | Rixen | |
| 5,496,089 A | 3/1996 | Muderlak | |
| 5,593,126 A | 1/1997 | Muderlak | |
| 5,607,087 A * | 3/1997 | Wery et al. | 222/610 |
| 5,655,694 A | 8/1997 | Keckeisen | |
| 5,788,134 A | 8/1998 | Matic, Jr. | |
| 5,803,333 A | 9/1998 | Fawcett | |
| 5,820,000 A * | 10/1998 | Timberlake et al. | 224/219 |
| 5,833,165 A | 11/1998 | Paugh | |
| 5,893,501 A | 4/1999 | Schwimmer | |
| 5,954,288 A * | 9/1999 | Shih | 242/380 |
| 5,964,385 A * | 10/1999 | Simon | 224/162 |
| 6,199,729 B1 | 3/2001 | Drzymkowski | |
| 6,247,619 B1 * | 6/2001 | Gill et al. | 222/105 |
| 6,283,344 B1 | 9/2001 | Bradley | |
| 6,382,481 B1 * | 5/2002 | McIlmoil | 224/162 |
| 6,401,997 B1 | 6/2002 | Smerdon, Jr. | |
| 6,431,422 B1 | 8/2002 | Moore et al. | |
| 6,454,131 B1 | 9/2002 | Van der Meer | |
| 6,502,727 B1 * | 1/2003 | Decoteau | 224/162 |
| 6,591,461 B2 * | 7/2003 | Salentine et al. | 24/115 F |
| 6,598,770 B2 * | 7/2003 | Bolts | 224/148.2 |
| 6,666,360 B1 * | 12/2003 | Swank | 224/148.2 |
| 6,953,135 B2 * | 10/2005 | Litton et al. | 224/414 |
| 6,964,361 B2 * | 11/2005 | Kathrein | 224/183 |
| 6,971,562 B2 | 12/2005 | Willows | |
| 7,073,688 B2 | 7/2006 | Choi | |
| 7,631,784 B2 * | 12/2009 | Hollis | 222/175 |
| 7,635,233 B1 * | 12/2009 | Coyer | 401/131 |
| 7,665,684 B2 * | 2/2010 | Salentine et al. | 242/379.2 |
| 7,802,746 B2 * | 9/2010 | Ito et al. | 242/379 |
| 8,220,676 B1 * | 7/2012 | Hicks | 224/162 |
| 2002/0135999 A1 | 9/2002 | Chen | |
| 2002/0170324 A1 * | 11/2002 | Wilson | 70/233 |
| 2004/0238549 A1 | 12/2004 | Murray | |
| 2004/0238570 A1 | 12/2004 | Skillern | |
| 2005/0258201 A1 | 11/2005 | Willows et al. | |
| 2005/0258203 A1 * | 11/2005 | Weaver | 224/162 |
| 2005/0279792 A1 * | 12/2005 | Batchelor | 224/414 |
| 2006/0113336 A1 | 6/2006 | Spencer | |
| 2007/0012740 A1 | 1/2007 | Montgomery | |
| 2007/0051842 A1 * | 3/2007 | Pryor | 242/378.3 |
| 2007/0181616 A9 | 8/2007 | Horito | |
| 2007/0278265 A1 * | 12/2007 | Contente | 224/162 |
| 2008/0010787 A1 * | 1/2008 | Kinskey | 24/298 |
| 2008/0265082 A1 | 10/2008 | Angiuli | |

* cited by examiner

Section A-A

COMBINATION HYDRATION, NUTRITION, AND PACK APPARATUS FOR A BICYCLE

CROSS-REFERENCE TO RELATED APPLICATIONS

Not applicable.

FEDERALLY SPONSORED RESEARCH

Not applicable.

SEQUENCE LISTING OR PROGRAM

Not applicable.

BACKGROUND OF THE INVENTION

1. Field of the Invention

This invention relates to Bicycle Accessories, and more specifically to an improved hydration, nutrition, and pack apparatus.

2. Prior Art

Methods and apparatus to aid the cyclist in hydration, nutrition, and accessory storage are numerous, since these needs were essentially born in conjunction with the invention of the bicycle. The most commonly encountered solutions to satisfying these needs today are; the bicycle mounted bottle cage and bottle, the collapsible bladder reservoir and tube hydration backpack with auxiliary storage compartments worn by the cyclist, saddle mounted bags/containers, and cycling garments adapted with pockets.

The most similar prior art to the invention herein disclosed are described in U.S. Pat. No. 5,062,591 to Runkel (1991) and U.S. Pat. No. 6,953,135 to Litton et al (2005). These "hands free" embodiments can be advantageous for cyclists who are normally in a forward and low tucked position, for example, competitive road or cycle-cross cyclists while in the lower drops of the handlebar, or time trialist and tri-athletes using aero-bars. There are disadvantages, however, that arise for the majority of cyclists who prefer to maintain a more neutral and upright body position while riding. For example, the physical manipulation required of a typical recreational cyclist, mountain cyclist, touring cyclist, or commuter cyclist to bend down and forward to reach with their mouth for a bite valve that is in a fixed location approximately above the handle bars and at seat level causes the cyclist to assume a posture that exceeds some people's flexibility range and can be awkward for even well conditioned athletes to assume while exerting themselves cycling. Furthermore, and especially in the case of Mountain Cycling, the terrain over which one is riding is often uneven, and having a rigidly mounted drink tube projecting into ones mouth while engaging uneven terrain may result in unexpected loss of control over the bite valve, or worse, in personal injury from the unexpected motion of the tube and valve. Commercialization of a Litton type apparatus (NeverReach™) has been specifically targeted to the tri-athlete market, demonstrating the practical limitations of this approach.

There are several other prior art variations of bicycle mounted hydration systems employing a flexible tube that enables the rider to access the hydration fluid without having to remove or otherwise directly handle a fluid reservoir that is attached to a bicycle frame. U.S. Pat. No. 6,401,997 B1 to Smerdon, Jr. (2002) provides a frame mounted reservoir connected to a flexible hydration tube that is routed up to the front of the bicycle and employing a large loop of the hydration tube that is removably attached to the bicycle stem with a hook and loop fastener and further attached with elastic cord. This arrangement disadvantageously creates a bulky, convoluted, and awkward assemblage of components in an area of the bicycle that requires a large degree of rotational freedom of movement during steering and which is already busy with other accessories (e.g.—lights, bicycle computers, etc.), cables, and/or hydraulic lines that are routed to front/rear derailleurs and front/rear brakes.

U.S. Pat. No. 5,788,134 to Matic, Jr. (1998) provides a frame mounted reservoir connected to a flexible hydration tube that is routed up and to the front of the bicycle where it is removably attached to the handlebar with a clasp device. Similar to the above described invention, this arrangement further congests an already busy area of the typical modern bicycle, and leaves a relatively long section of hydration tube unsupported between the last attachment to the bicycle frame and the clasp attachment to the handlebar which while riding over uneven terrain would undergo objectionable motion.

U.S. Pat. No. 5,201,442 to Bakalian (1993) and U.S. Pat. No. 5,301,858 to Hollander (1994) provide a bicycle frame mounted reservoir connected to a flexible hydration tube that is routed on and fixed to the bicycle frame and/or handlebar of the bicycle. These apparatus are thus encumbered with the disadvantages aforementioned for the hands free apparatus described above.

Similarly, U.S. Pat. No. 4,095,812 (1978) and U.S. Pat. No. 4,274,566 (1981) to Rowe employ a bicycle frame mounted hydration supply with a connecting the flexible hydration tube that is itself retracted into disadvantageously complex and bulky apparatus that are mounted to the top tube of the bicycle frame.

U.S. Pat. App. No. 20040238549A1 by Murray (2004) describes a multi purpose "packwedge" accessory that mounts inside the main triangle of a conventional bicycle, and relies on a flexible drinking straw to be fixed such that the bicyclist must bend down and find the straw with their mouth, thereby suffering from the same disadvantages as those stated for the "hands free" systems of U.S. Pat. No. 5,062,591 to Runkel (1991) and U.S. Pat. No. 6,953,135 to Litton et al (2005).

Similarly, U.S. Pat. App. No. 20070012740A1 by Montgomery (2007) describes an aerodynamic fluid holder for bicycles that mounts forward of the handlebars and receives one or more fluid packs that rely on a semi-rigid straw to transmit hydration to the rider. Numerous other aerodynamically shaped handlebar mounted water bottle systems are commercially available, for example the Profile Design Aerodrink System and the Revolution Hydration System, however they all suffer from the same disadvantages as those stated for the "hands free" systems of U.S. Pat. No. 5,062,591 to Runkel (1991) and U.S. Pat. No. 6,953,135 to Litton et al (2005).

Several methods and apparatus have been invented to provide pressure assisted delivery of hydration fluids to the cyclist, refer to U.S. Pat. No. 5,062,591 to Runkel (1991), U.S. Pat. No. 5,158,218 to Wery (1992), U.S. Pat. No. 5,201,442 to Bakalian (1993), U.S. Pat. No. 5,326,124 to Allemang (1994), and U.S. Pat. No. 6,454,131 to Champion (2002). While a pressure assisted hydration fluid delivery system may add a level of convenience and/or novelty it is generally not required to enable a cyclist to obtain hydration from a bicycle mounted apparatus. Some bicycle mounted hydration apparatus may have inherently large negative pressure differentials in the hydration fluid path arising from excessive combination of static head pressure and dynamic pressure drop throughout the apparatus. For example, when the hydration source is mounted low on bicycle a large static "head" pressure is created which must be overcome. Dynamic pressure losses in the system increase in proportion to length of hydration tube, the number/size/shape of constrictions and convolutions in the fluidic path. Dynamic pressure loss in the apparatus is inversely proportional to the cross-sectional area of the inside of the hydration tube. In such cases where excessive pressure drop is present in the system pressurization of the hydration source may be a practicable solution to overcome the cumulative negative pressure, thus making the system more easy to use. Disadvantages of incorporating pressurization to a hydration system include increased complexity, added cost, and increased weight.

The conventional bicycle frame mounted cage and water bottle system, e.g. U.S. Pat. Nos. 4,386,721 and 4,441,638 to Shimano (1983 and 1984 respectively), has served cyclists well, and continues to hold sway with the general cycling public, however this approach too has some disadvantages and limitations. First, a cyclist must reach down and grasp a bottle to remove it from a bicycle frame mounted cage. The cyclist must then lift the bottle up above one's head while simultaneously inverting the bottle to direct the valve outlet down and into the mouth while cocking the head up and back so as to contain and subsequently swallow the fluid being ejected or sucked from the bottle. Upon completion of obtaining the some volume of hydration fluid the rider then has to replace the bottle into the frame mounted cage. This complex set of motions clearly has potential to distract or otherwise defocus the riders' attention from the task of maintaining control of the bicycle, and of course the rider is relying on only one hand to control the handlebars of the bicycle for the duration of the drinking process. Secondly, the bottle cage mounted approach is limited in capacity by the volume of water bottle being used multiplied by the number of bottle cage mounts available on the bicycle. A typical example would be a bicycle with two standard bottle cage mounts using large 28 oz bottles (2×28=56 oz), which may be less than that desired and/or required by long distance cyclists. A lack of adequate hydration adversely affects an individual's performance and can lead to dehydration. Thirdly, it is possible for water bottles to inadvertently come free, or eject, from the bicycle mounted cage in cases of extreme accelerations or decelerations such as that commonly encountered while mountain cycling at high speeds over rough terrain. This situation can become dangerous as the free flying mass of the ejected water bottle poses an unexpected safety hazard to the rider and adjacent or subsequent riders over the affected terrain. Additionally, in a race it is unlikely that the rider will stop to retrieve the ejected water bottle due to the adverse affect this activity would have on the riders' position in the race, thereby leaving the rider with an unexpected deficit of hydration fluids and potentially leaving a hazardous obstacle on the race course for subsequent riders to negotiate.

The hydration backpack, e.g.—U.S. Pat. No. 4,526,298 to Boxer (1985) and U.S. Pat. No. 5,803,333 to Fawcett (1998), and hands-free variants thereof, e.g.—U.S. Pat. No. 6,199,729 B1 to Drzymkowski (2001) and U.S. Pat. No. 6,283,344 to Bradley (2001), enables the cyclist to carry adequate hydration and nutrition, as well as other accessories, however the burden of this significant load is taken by the rider directly. Wearing a hydration backpack can cause discomfort from the various shoulder, chest and waist straps employed to transfer and secure the load onto one's body. Further, the cyclists' efficiency and subsequent performance is directly affected by their ability to manage physiological heat production. During extreme physical exertion typified by the competitive cyclist it is highly desirable to dissipate heat away from the body. The hydration backpack, however, effectively insulates the rider from transferring this heat away wherever it is in contact with the cyclists' body. The discomfort and degraded heat management experienced by the rider is further exacerbated by a resulting accumulation of perspiration in the padded materials of a typical backpack and in garments contacting the backpack, adding to the load that the cyclist must bear. For these reasons many competitive and extreme sport cyclists continue to favor the bicycle mounted cage and water bottle, with all of its disadvantages and limitations, over the backpack hydration systems.

Hydration systems relying on a flexible tube to transmit hydration fluid from a remotely located supply can benefit from a quick-disconnect coupling at either end of the tube in order to establish a mechanical and fluidic interface with adjacent components, for example a reservoir or a bite valve. One commonly encountered example of a quick disconnect mechanical and fluidic interface is the barbed fitting. While the barbed fitting is simple and inexpensive, it is not always an easy to execute or robust solution for repeated assembly and disassembly. Another quick-disconnect fluidic coupling to provide component connectivity on a bladder type personal hydration apparatus is described by U.S. Pat. No. 7,073,688 to Choi et al (2006). Additional means for creating quick-disconnect, or make-break, fluidic interfaces on other hydration systems can be found in U.S. Pat. App. No. 20060113336A1 by Spencer (2006), where a shoulder mounted hydration apparatus is fitted with a quick disconnect fluidic interface at the hydration tube inlet, and U.S. Pat App. No. 20040238570A1 by Skillern (2004), where a hydration bladder apparatus employs a quick-disconnect fitting at the bladder outlet.

Other apparatus where the hydration/nutrition/storage pack is styled more as a belt to be worn around the waist have also been developed, for example the product FuelBelt™ and U.S. Pat. No. 6,971,562 to Willows et al (2005). While these systems offer a good overall solution for athletes engaging in running or multiple sports that include running, such as triathletes, they suffer from the same disadvantages as the backpack resulting from the user having to bear the burden of the load directly.

The bicycle seat mounted pack is commonly used by cyclists to carry tools, spare parts, additional garments, maps, and nutrition/hydration supplements. Seat and seat post mounted pack inventions have primarily focused on the methods of pack construction, manner of access, and means of attachment to the bicycle. Refer to U.S. Pat. No. 4,442,960 to Vetter (1984), U.S. Pat. No. 4,629,040 to Jones (1986), U.S. Pat. No. 5,127,563 to Chan et al (1992), U.S. Pat. No. 5,474,270 to Rixen et al (1995), U.S. Pat. Nos. 5,496,089 and 5,593,126 to Muderlak (1996 and 1997), U.S. Pat. No. 5,655,694 to Keckeisen (1997), U.S. Pat. No. 5,893,501 to Schwimmer (1999), and U.S. Pat. No. 6,431,422 to Moore (2002). The main disadvantage of using a conventional seat mounted pack for carrying supplemental nutrition and hydration fluids is that they require the cyclist to stop and dismount the bicycle in order to access the contents, which presents a general inconvenience to all cyclist, and a significant disadvantage to competitive cyclists.

U.S. Pat. No. 4,629,040 to Jones (1986), SOFT SADDLE BAG WITH RIGID REINFORCING INSERT, describes the use of a rigid insert to provide shape and structure to a soft luggage shell. This invention has been broadly applied to commercialized bicycle panniers and saddle bags.

Cycling garments adapted with pockets to hold supplemental nutrition and/or hydration suffer from the same comfort and heat dissipation disadvantages as the hydration backpack systems, albeit to a lesser degree. Additionally, garment pockets are typically more limited in capacity than bicycle mounted and backpack systems.

U.S. Pat. No. 6,666,360 to Swank (2003), PERSONAL HYDRATION SYSTEM FOR RUNNERS, employs a retractable "badge" reel device to hold and control a mid-span of flexible hydration tubing on a personal hydration system for runners. The application of this device is specifically human mounted. No prior art relating to the use of a reel with spring retracting string to secure accessories to a bicycle has been found.

Nutritional supplements commonly used by cyclists include prepackaged energy bars and other discrete nutritional elements. A main disadvantage of the aforementioned prepackaged products is that they typically require both hands to open, and are thus difficult to use while continuing to ride a bicycle. Concentrated gel nutritional supplements address this disadvantage by way of being dispensed from a flask which can be carried in a easy to reach pocket and consumed with the aid of only one hand, however the gel itself is inherently messy and not universally preferred or accepted as a preferred medium for nutrition. A further disadvantage of these nutrition systems is that they are susceptible to contamination from handling and external sources once that they are opened.

U.S. Pat. App. No. 20050258201A1 by Willows (2005), describes a bottle retaining device that may be applied to attach various accessory items, including a bottle or nutrition flask, to a bicycle.

No other relevant prior art was found relating to means of dispensing nutrition for bicyclists and other athletes.

As is evidenced by the shortcomings of the prior art herein described, there is a need for a combination hydration, nutrition and pack apparatus for cyclists that is safe and easy to use, and that relieves the related burden from being born directly by the cyclist. There is also a need for a nutrition dispensing device that is safe, easy to operate, clean, convenient to store and carry, and that frees the user from dealing with related packaging at the time of consumption.

SUMMARY

In accordance with the present invention a combination hydration, nutrition, and pack apparatus for a bicycle, hereafter referred to as hydration pack, comprises a bicycle mounted apparatus incorporating a hydration supply reservoir, and optional accommodations for auxiliary supplies. Supplies may include items such as supplemental nutrition and devices to dispense nutritional supplements, tools, spare bicycle parts, clothing, and other accessories typically employed by cyclists. The hydration supply reservoir is connected at an outlet to a flexible hydration tube that is routed on and removably attached to a bicycle at one or more locations with retracting reel assemblies. The tube is terminated at the other end with a bite actuated valve that the bicyclist uses to draw hydration fluid through from the flexible hydration tube and reservoir. The retracting reels serve to hold the tube in the desired position while not in use. The retracting reels allow the hydration tube to extend away from the stored position when in use by a cyclist. The retracting reels automatically return the hydration tube to the stored position when not in use. This summary represents a general embodiment, where many specific alternative embodiments are possible given all of the potential apparatus feature combinations. Additional specific alternative embodiments arise from the variations in size, style, and layout of the bicycle to which the apparatus is intended, as well as various cycling user groups' specific needs.

DRAWINGS—FIGURES

DRAWINGS—REFERENCE NUMERALS

Figure 1:
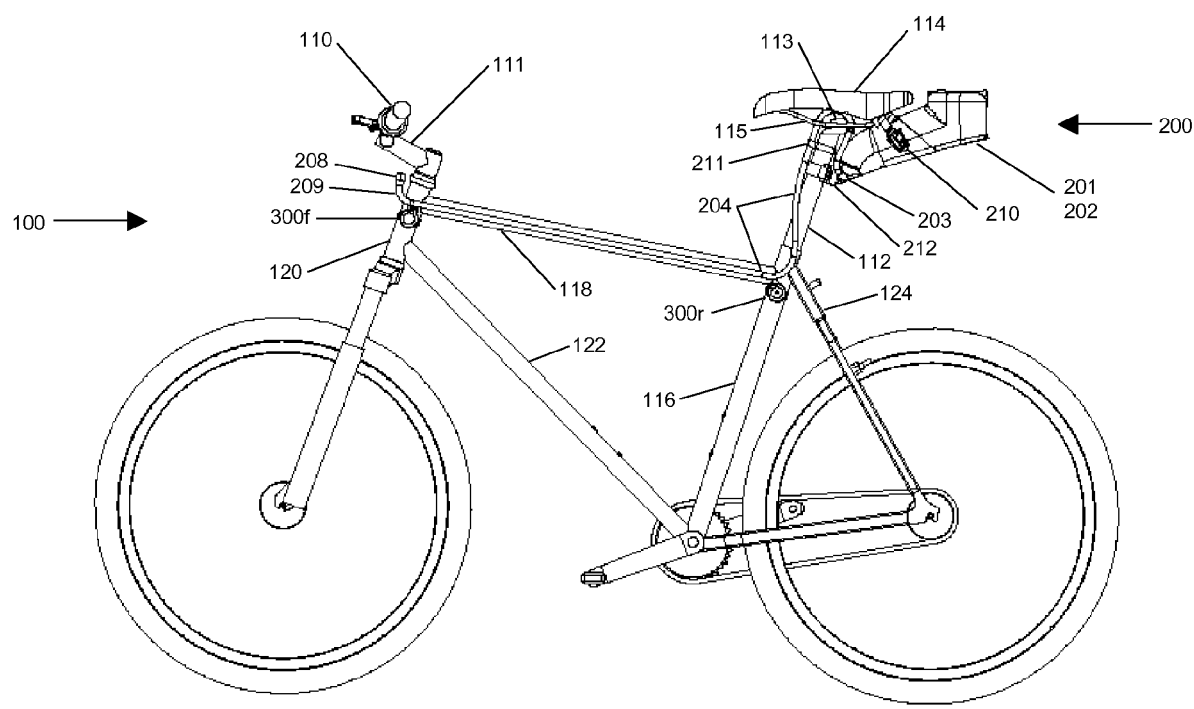
FIG. 1 shows a side view of a general hydration pack embodiment installed on a bicycle.

- 100—Bicycle
- 110—Handle Bar
- 111—Stem
- 112—Seat Post
- 113—Seat Clamp
- 114—Seat
- 115—Seat Rails
- 116—Seat Tube
- 118—Top Tube
- 120—Head Tube
- 122—Down Tube
- 124—Seat Stay
- 200—Hydration Pack
- 201—Reservoir
- 201A—Reservoir A
- 202—Pack Shell
- 203—Outlet
- 203A—Outlet A
- 204—Hydration Tube
- 205—Fill Port
- 205A—Fill Port A
- 206—Fill Cap
- 206A—Fill Cap A
- 206B—Fill Cap Vent Hole
- 206C—Fill Cap Vent Face
- 207—Make-up Air Check Valve
- 207A—Check Disc
- 208—Bite Valve
- 209—Bite Valve Body
- 210—Seat Strap Assembly
- 210a—Reservoir Strap
- 210c—Wedge Pad
- 210d—Ratchet Strap
- 210e—Ratcheting Assembly
- 211—Tube Strap
- 211a—HL Strap
- 211b—Fixed Tube Clip
- 212—Seat Post Strap Assembly
- 213—Strap Base
- 214a—Base Screw
- 214b—Base Nut
- 215—Seat Post Strap
- 215a—Seat Post Strap Hooks
- 215b—Seat Post Strap Pad
- 216—Base Pad
- 217—Strap Pin
- 218—Toggle Arm
- 219—Toggle Arm Pin
- 220—Reservoir Base
- 221—Closure
- 222—Quick Access Pocket, Accessory
- 223—Secure Accessory Pocket, Accessory
- 224—Nutrition Holster, Accessory
- 225—Nutrition Dispenser, Accessory
- 226—Pump and Pump Bracket, Accessory
- 227—M5 Nut Inserts, Accessory
- 228—Fender Clip, Accessory
- 229—Fender, Accessory
- 230—Tail Light Clip, Accessory
- 231—Reflective Surface, Accessory
- 232—Leash
- 233—Leash Pin
- 233A—Leash Pin Vent Hole
- 233B—Leash Pin Vent Face
- 234—Seat Post Block
- 234A—Tube Hole
- 234B—Strap Slot
- 234C—Arched V Channel
- 235—Pocket Recess
- 236—Stabilizing Protrusion
- 300f—Tube Reel Assembly, forward position
- 300r—Tube Reel Assembly, rearward position
- 301—Reel Assembly
- 302—Reel Body
- 302A—Reel Body A
- 302B—Reel Body B
- 302C—Reel Body C
- 302D—Reel Body D
- 302E—Reel Body E
- 303—Spool Axel
- 304—Reel Cover
- 304A—Reel Cover A
- 304B—Reel Cover B
- 304C—Reel Cover C
- 304D—Reel Cover D
- 304E—Reel Cover E
- 304F—Reel Cover F
- 305—Line (e.g., String)
- 306—Spool
- 307—Spool String Anchor
- 308—Spool Spring Hook
- 309—Spring
- 310—Tube Clip
- 310A—Tube Clip A
- 310B—Tube Clip B
- 310C—Tube Clip C
- 311—Eyelet
- 312A—Magnet A
- 312B—Magnet B
- 313—Strap Slot
- 314—Strap Assembly
- 315—D-Ring
- 316—Strap Axel
- 317—Axel Flange
- 318—Strap Pad
- 318A—Strap Pad A
- 318B—Strap Pad B
- 320—Strap with Hook and Loop
- 321—Strap Bracket
- 321A—Strap Bracket A
- 322—Post
- 400—Cyclist
- 500—Bicycle5
- 501—Reservoir5
- 501A—Bottle5 Assembly
- 502—Res5 Bracket
- 502r—Reserve Res5 Bracket
- 502s—Seat Res5 Bracket
- 502h—Fixed Hook
- 503—Outlet5
- 504—Tube5
- 505—T
- 506—Fill Cap6

507—Receiving Socket
508—FI Valve with Annular Seal
509—FI Actuator to Barb Fitting
510—Latch Arm
510r—Release Button
512—Seat Post5
514—Seat5
515—Seat Rails5
516—Seat Tube5
522—Down Tube5
600—Bicycle6
601—Reservoir6
602—Res6 Bracket
603—Outlet6
604—Tube6
610—Handlebar6
614—Seat6
616—Seat Tube6
618—Top Tube6
700—Bicycle7
701—Reservoir7
702—Res7 Strap
703—Outlet7
704—Tube7
718—Top Tube7
800—Nutrition Dispensing Apparatus
801—Nutrition Element
802—Body
803—Barrel
804—Trigger
806—Fill Port
902—Accessory
910—Accessory coupler

DETAILED DESCRIPTION

Figure 2:
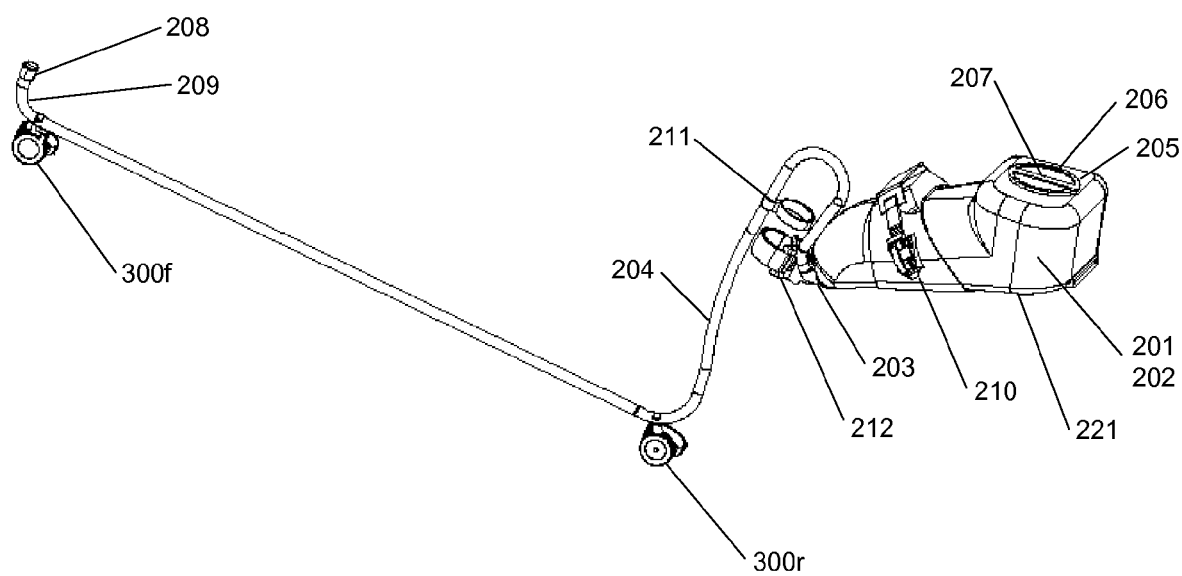
FIG. 2 shows a perspective view of a general hydration pack embodiment.

General Embodiment—FIGS. 1, 2, and 3

FIG. 1 shows a basic version of the hydration pack apparatus 200 as it is mounted to a bicycle 100. The bicycle 100 is comprised of a handlebar 110, a stem 111, a seat post 112, a seat clamp 113, a seat 114, two seat rails 115, a seat tube 116, a top tube 118, a head tube 120, a down tube 122, and a seat stay 124. The hydration pack is comprised of a pack shell 202 that fits closely over a reservoir 201. The reservoir 201 is attached to the bicycle 100 at the seat post 112 with a seat post strap assembly 212 and to the seat 114 with a seat strap assembly 210. An outlet 203 is located at the lowest position on the reservoir 201. The outlet 203 passes from the interior to the exterior of the pack shell 202. A flexible hydration tube, or tube, 204 is connected to the outlet 203. The tube 204 is routed on and attached to the bicycle as follows: up from the reservoir outlet 203 to the back underside of the seat 114, up between the two seat rails 115 and under the seat 114, forward and over the seat clamp 113, down between the seat rails 115 at the front of the seat 114, down the front of the seat post 112, attached to a first rearward positioned tube reel 300r, forward along the top tube 118, and finally attached to a second forward positioned tube reel 300f. The tube 204 is terminated at the forward end with an optional bite valve body 209. A bite actuated valve 208 fits onto the bite valve body 209. Optionally, the tube 204 is removably attached to the seat post 112 with one or a plurality of tube straps 211, as required to secure the tube 204 in the desired position. The rear tube reel 300r is removably attached to the bicycle 100 on the seat tube 116. The front tube reel 300f is removably attached to the bicycle 100 on the head tube 120.

Referring to FIG. 2, a perspective view of a hydration pack assembly is shown. The reservoir 201 has a fill port 205 located at the highest position on the assembly. A fill cap 206 is removably attached to the fill port 205 with either a snap fit or threaded engagement. The fill cap 206 is fitted with a make-up air check valve 207. The reservoir 201 is molded from a semi-rigid material, for example food grade polycarbonate or high density polyethylene. The pack shell 202 which fits closely over the reservoir 201 is constructed of a fabric type material. It is contemplated that the pack material should be durable, light weight, hydrophobic, abrasion resistant, thermally insulating, and easy to clean. A closure 221 provides access for assembling or disassembling the reservoir 201 to the pack shell 202. The closure 221 may be a zipper or hook and loop. The shape of the reservoir 201 is contoured in the forward area to prevent interference with cyclist's legs and concave along the bottom surface to complement the curvature of a bicycle wheel. The volume of the reservoir 201 depicted is 2.3 liters, however, it has been contemplated that the volume of a reservoir can range from 0.5 liter to 4 liters for different embodiments.

Figure 2A:
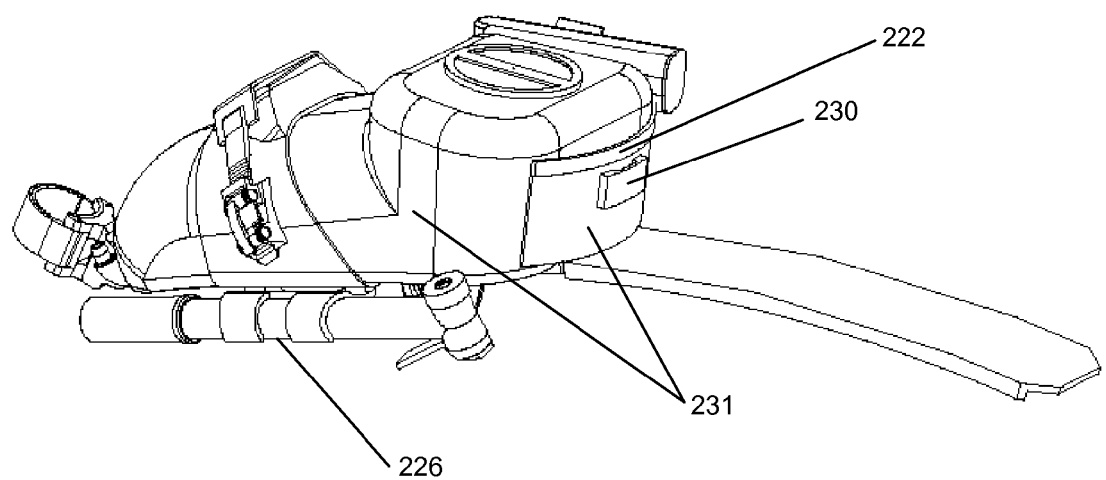
FIGS. 2A and 2B show perspective views of a general hydration pack embodiment that includes several accessory features.
Figure 2B:
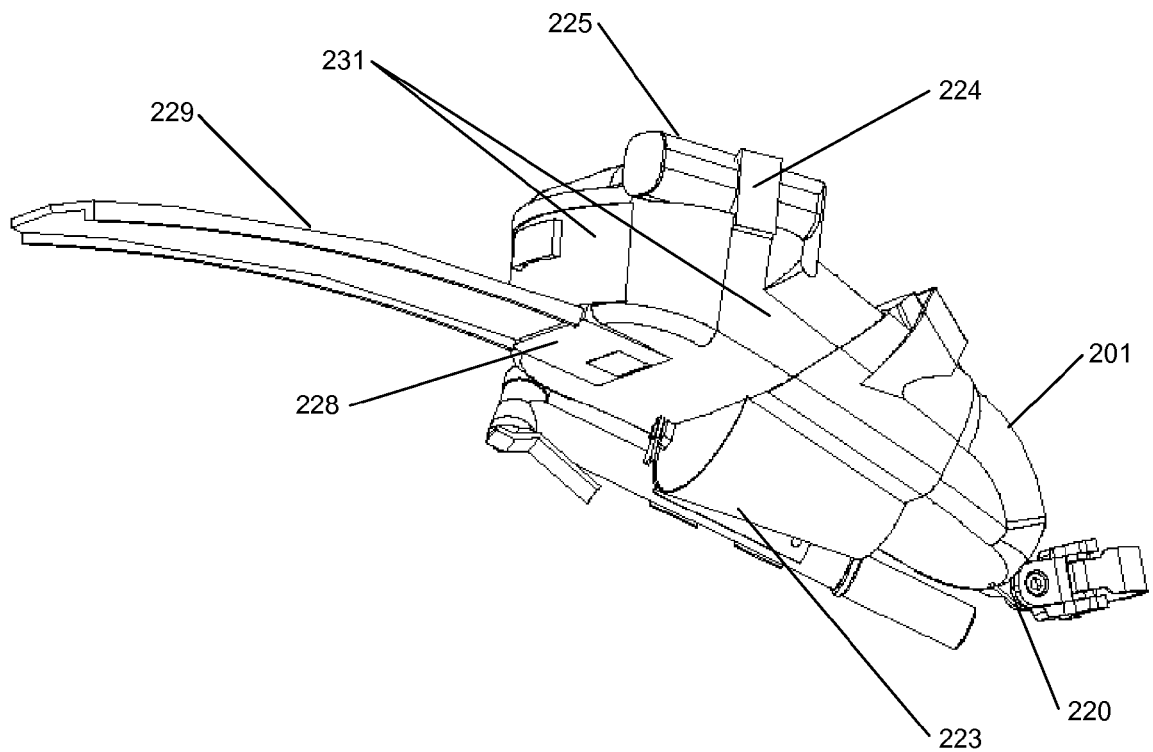

FIGS. 2A and 2B show different perspective views of a hydration pack embodiment that includes several accessory features. Accessory features which can be integrated with the hydration pack include; quick access pocket 222 for ergonomic and safe access to pre-packaged nutritional supplements and other supplies, a nutrition holster 224 for ergonomic and safe access to a nutritional supplement dispensing device 225, a secure accessory pocket 223 with zipper closure, a pump and pump bracket 226 which attaches to two size M5 nut inserts 227, a fender 229 that removably attaches into a fender clip 228 feature, a tail light clip 230, and side and rear facing reflective surfaces 231.

Figure 2C:
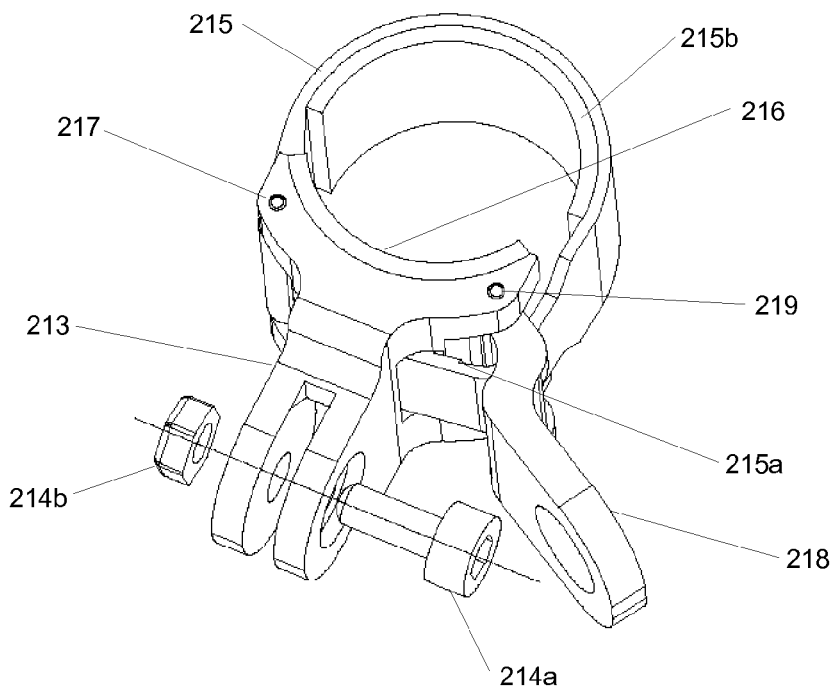
FIG. 2C shows a perspective view of a seat post strap assembly.

FIG. 2C shows a detailed perspective view of the seat post strap assembly. The seat post strap assembly is comprised of a strap base 213, a base screw 214a, a base nut 214b, a seat post strap 215 with integrally formed seat post strap hooks 215a, a seat post strap pad 215b, a base pad 216, a strap pin 217, a toggle arm 218, and a toggle arm pin 219. The seat post strap is attached to the strap base 213 with the strap pin 217. The base pad 216 is affixed to the strap base 213. The seat post strap pad 215b is affixed to the seat post strap 215. The toggle arm 218 is attached to the strap base 213 with the toggle arm pin 219. The base screw 214a and base nut 214b attach the seat post strap assembly 212 to a reservoir base 220 feature, as shown in FIG. 2B.

Figure 2D:
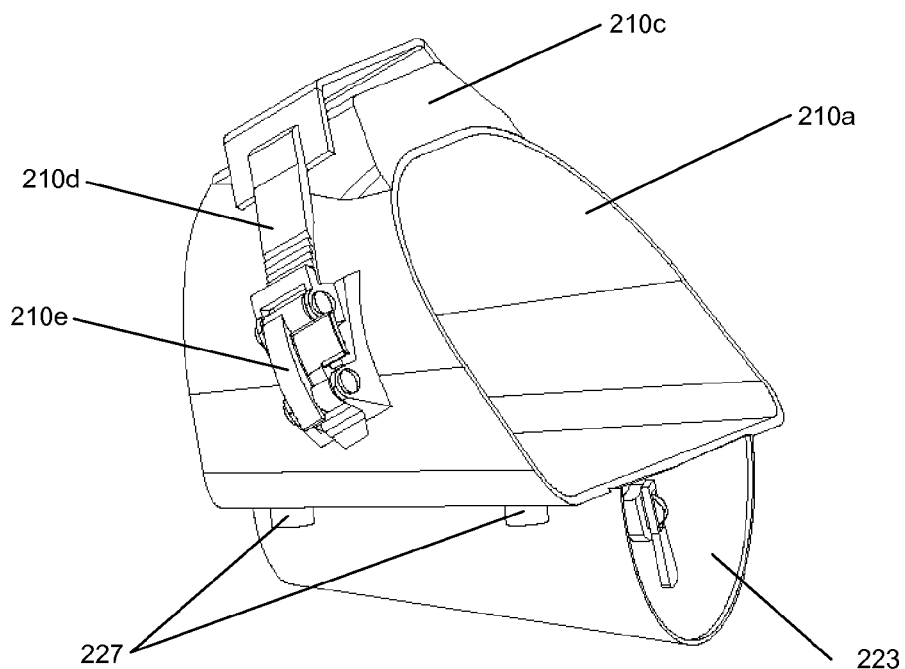
FIG. 2D shows a perspective view of a seat strap assembly.

The seat strap assembly of FIG. 2D is comprised of a wedge pad 210c, a ratchet strap 210d, and a ratcheting assembly 210e, all of which are attached to a reservoir strap 210a. Accessory features may be incorporated with the seat strap assembly, for example a secure accessory pocket 223, or M5 nut inserts 227.

Figure 2E:
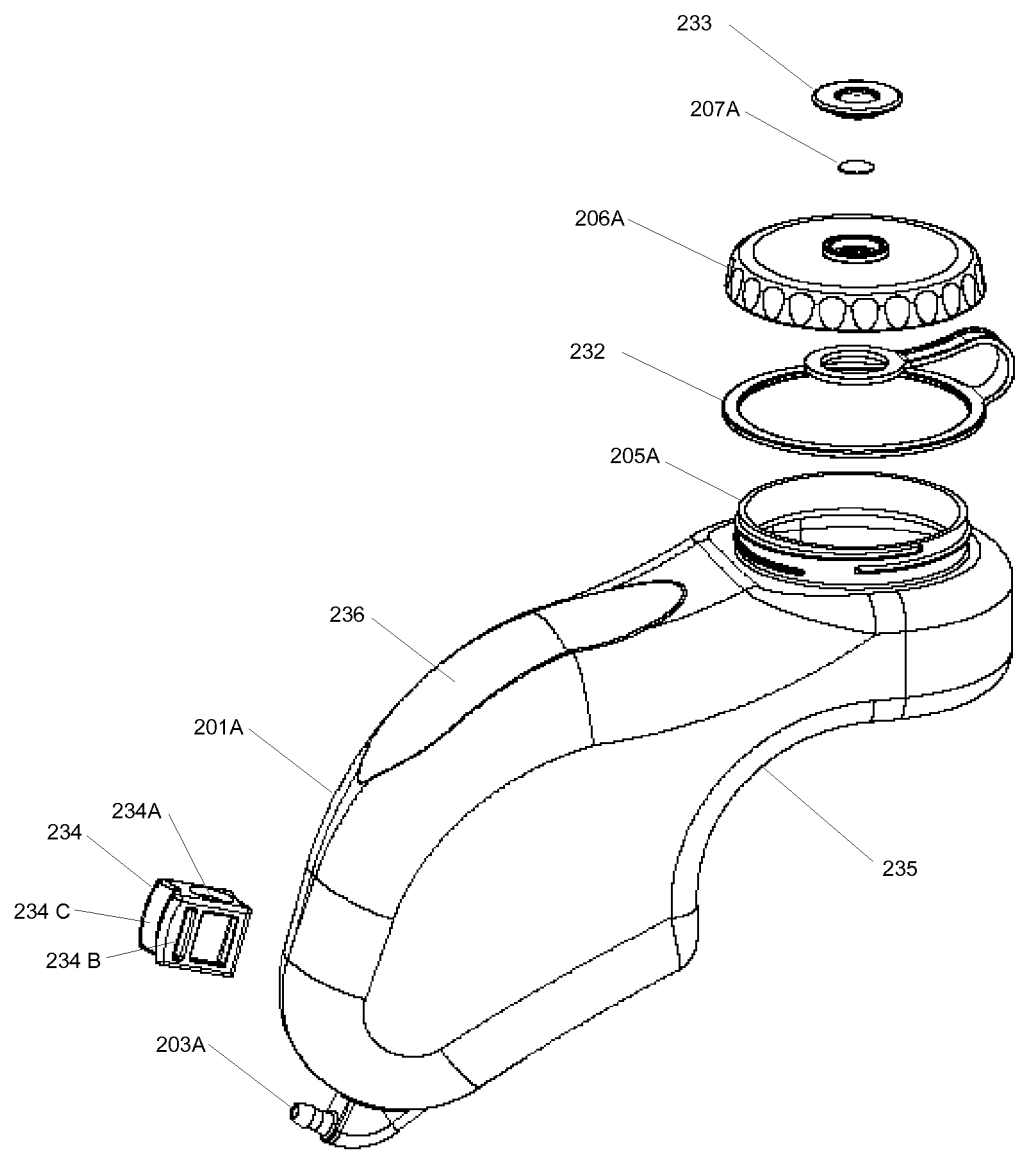
FIG. 2E shows an exploded perspective view of an alternative embodiment of a reservoir assembly.
Figure 2F:
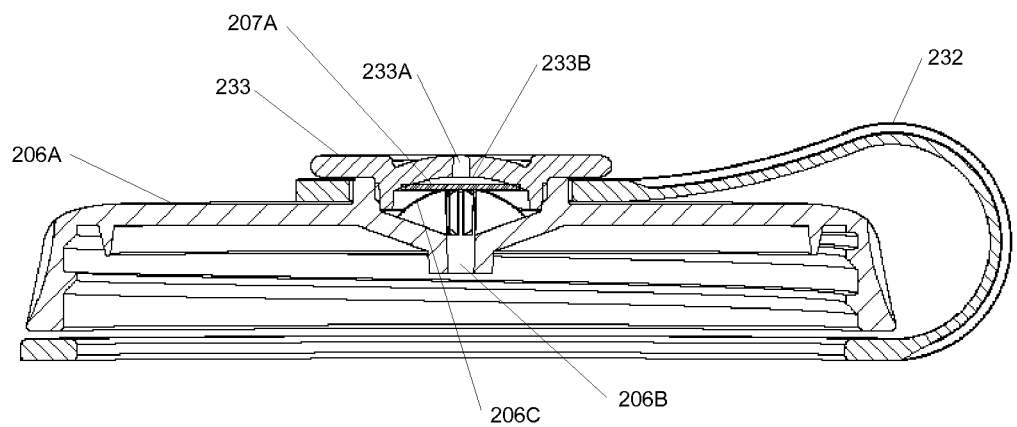
FIG. 2F shows a detailed cross section view of a fill cap assembly.
Figure 2G:
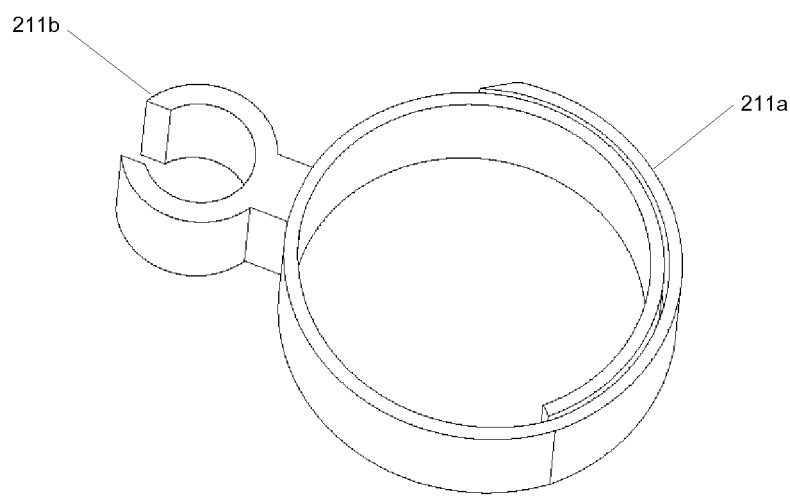
FIG. 2G shows a perspective view of a tube strap.

The tube strap 211 shown in FIG. 2G is comprised of a HL strap 211a and fixed tube clip 211b. The HL strap 211a is a fabric strap with hook and loop fastening surfaces. The fixed tube clip 211b is of molded plastic and is attached to the HL strap 211a.

Figure 3A:
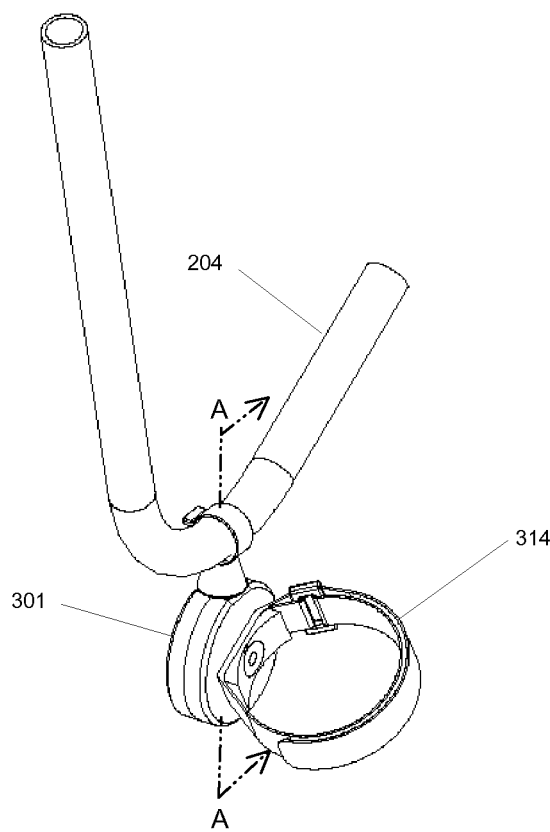
FIG. 3A shows a perspective view of a tube reel assembly and a section of hydration tube.

Referring to FIG. 3A a tube reel assembly is shown with a section of hydration tube 204. The tube reel assembly is comprised of a spring actuated reel assembly 301 and a strap assembly 314. The hydration tube 204 removably clips onto the tube reel assembly 301.

Figure 3B:
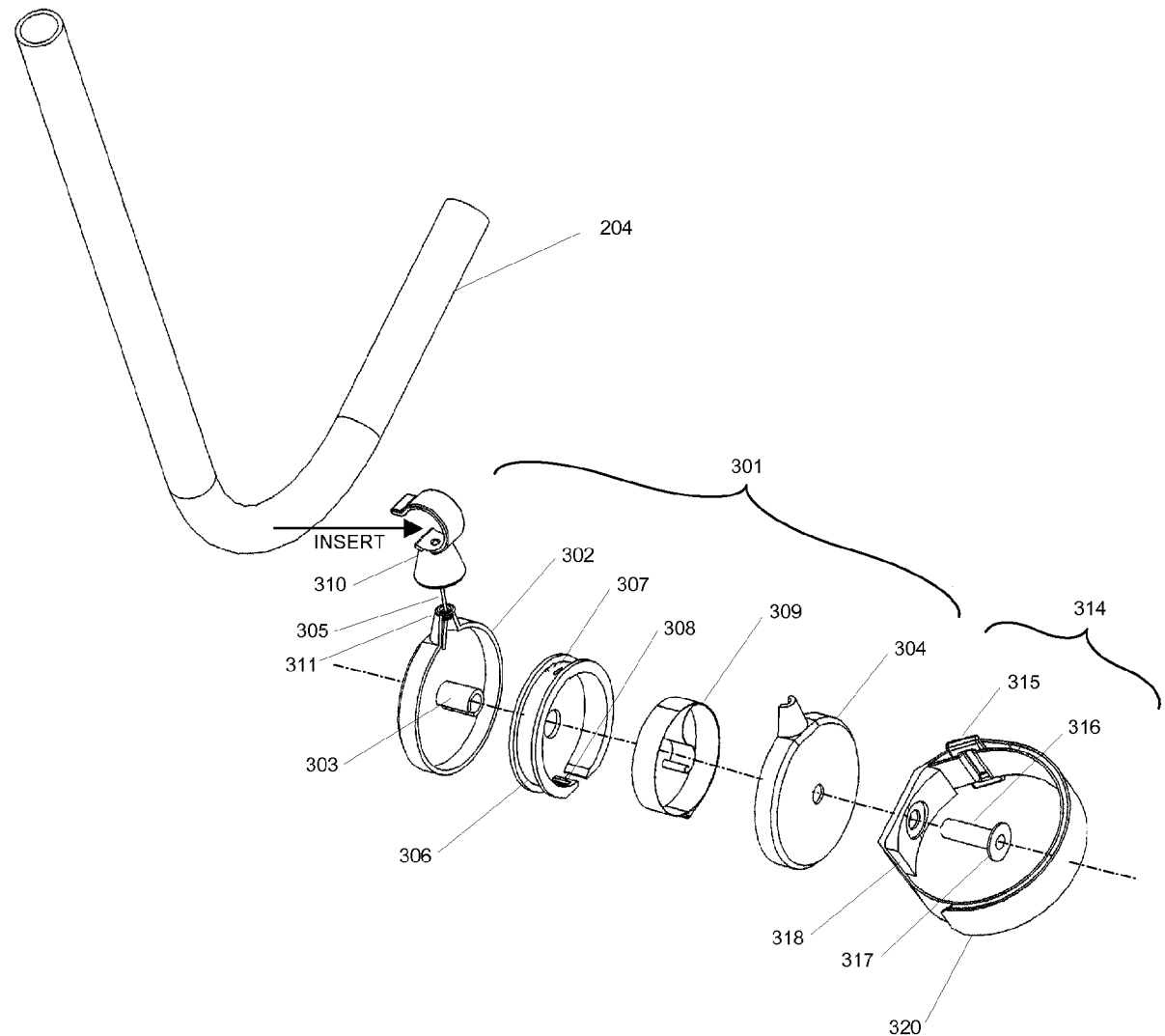
FIG. 3B shows an exploded perspective view of a tube reel assembly and a segment of hydration tube.

An exploded view of a tube reel assembly is shown in FIG. 3B. The reel assembly 301 is comprised of a reel body 302, a reel cover 304, a string 305, a spool 306, a spring 309, a tube clip 310, and an eyelet 311. The spool 306 fits over a spool axel 303 on the reel body 302. The spring 309 fits within the spool 306. The inner end of the spring 309 is sharply bent and hooks onto a slot in the spool axel 303. The outer end of the spring 309 is sharply bent and hooks onto the spool spring hook 308. The eyelet 311 is held in an opening created between the reel body 302 and reel cover 304. The string 305 is connected on one end to the spool 306 at a spool string anchor 307, and is wound around the spool 306, passes through the eyelet 311, and attaches on its other end to the tube clip 310. It is contemplated that the string 305 length may be from 24 to 48 inches. The reel cover 304 fits to the reel body 302 and the two are joined together at their mating perimeter. The lower portion of the tube clip 310 assumes a conical shape that engages a complementary conical shape on the reel body 302 and reel cover 304 when in a retracted position. The strap assembly 314 is comprised of a strap with hook and loop 320, a strap pad 318, a D-ring 315, and a strap axel 316. The strap axel 316 passes through holes in the strap pad 318, strap 320, reel cover 304, and reel body 302. A protruding tip of the strap axel 316 is mechanically formed over the reel body 302, securing the strap assembly 314 to the reel assembly 301.

Operation

General Embodiment—FIGS. 1, 2, 3, and 4

Installation and Set-Up

Referring to FIGS. 1 and 2D, the seat strap assembly 210 fits over the pack shell 202 and reservoir 201. The seat strap assembly 210 attaches the hydration pack 200 to the seat 114 by feeding the ratchet strap 210d over the seat rails 115 and then into the ratchet assembly 210e. The wedge pad 210c engages the bicycle seat rails 115 via direct contact, providing additional stability to the installation. The seat strap assembly is tightened by actuating the ratchet assembly 210e, thus securing the hydration pack 200 in the desired position. The hydration pack 200 is removed from the seat 114 by releasing the ratchet assembly 210e to disengage the seat strap assembly 210.

Referring to FIGS. 1 and 2C, the hydration pack 200 is attached to the seat post 114 with the seat post strap assembly 212. The seat post strap 215 has a plurality of latch hooks 215a which can be individually engaged by the seat post toggle arm 218. The latch hooks 215a allow for the seat post strap 215 to be tightened in increments around the seat post 114, thus accommodating variations in seat post 114 diameters. The toggle arm 218 rotates into the closed position pulling the seat post strap 215 into tension and causing the seat post strap pad 215b and base pad 216 to compress, thereby allowing for an accurate fit and secure attachment to the seat post 114. The strap base 213 attaches to the reservoir base 220, as shown in FIG. 2B. The reservoir 201 is rotationally adjustable relative to the seat post strap assembly 212 about the axis of the base screw 214a.

Referring to FIG. 3B, the tube reel assembly attaches to a bicycle by way of the strap assembly 314. When the strap 320 is loose the reel assembly 301 can be rotationally adjusted about the axis of the strap axel 316 relative to the strap assembly 314. As the strap 320 is tightened around a member of a bicycle 100, for example a seat tube or head tube, the strap pad 318 is compressed against the axel flange 317 on the strap axel 316, fixing the reel assembly 301 against rotation about the axis of the strap axel 316. The holding force that resists rotation is derived from the friction generated between the strap pad 318 and axel flange 317. Surface textures and/or additional geometry may be applied to the mating surfaces of the strap pad 318 and the axel flange 317 in order to increase the friction force.

Referring to FIG. 1, the front tube reel 300f is normally mounted to the side of the bicycle 100 favored by a cyclist when temporarily releasing the handle bar 110 with one hand to grasp something. The front and rear tube reels 300f and 300r can be oriented to any practicable position relative to the members they are attached to, for example; either the left or right side of the bicycle 100, to the top of the top tube 118, or to the interior of the bicycle 100 frame.

Routing the assembled valve 208, valve body 209, and tube 204 through the saddle is facilitated by virtue of an arced geometry in the bite valve body 209. Further advantages of an arched bite valve body 209 include more ergonomic engagement of the bite valve to the user's mouth versus a straight valve body, and improved flow versus a sharp 90 degree bend or small radii arched valve bodies. The major radius of the bite valve body 209 shown is 30 mm, however other radii in the range 10 mm to 60 mm may be employed.

Figure 4:
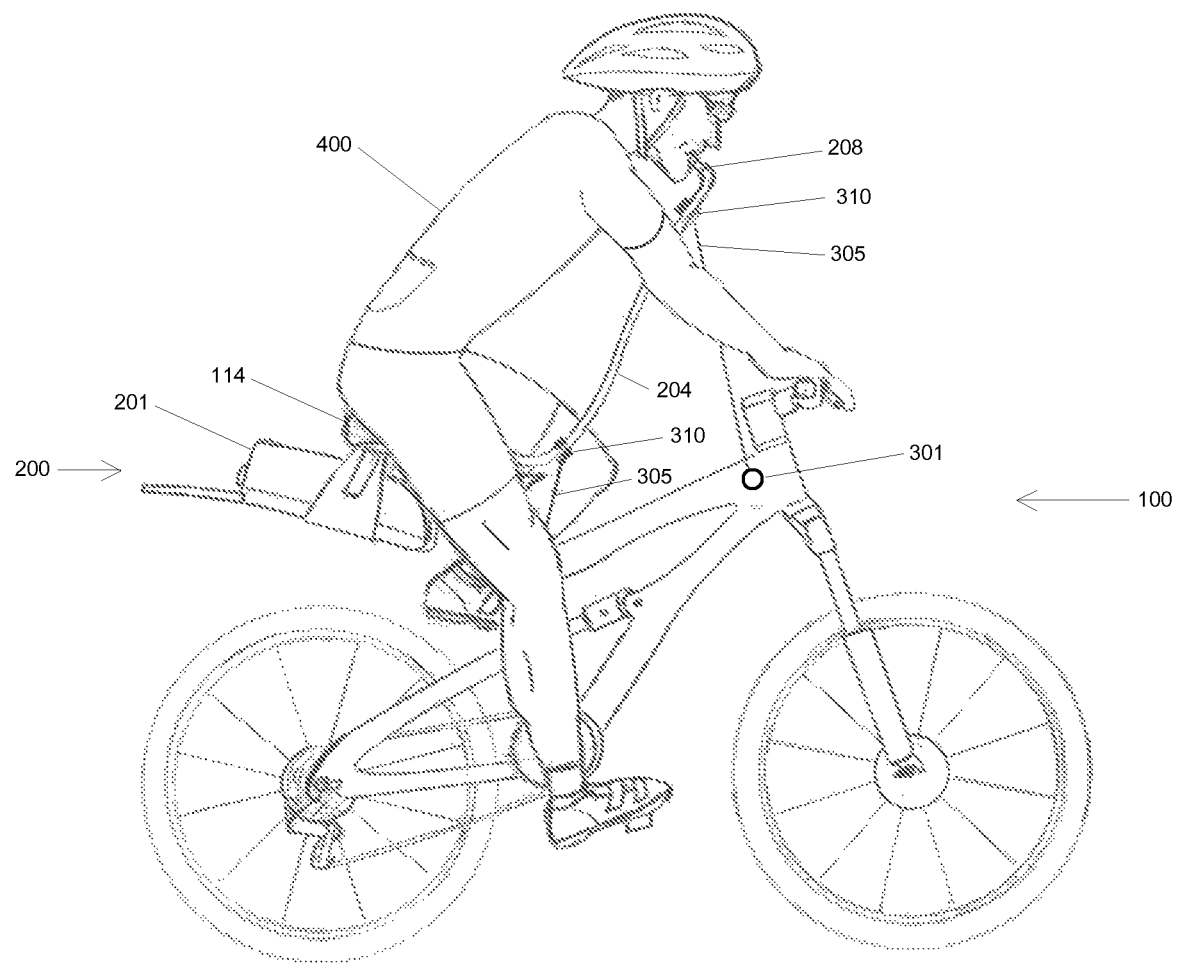
FIG. 4 shows a side view of a bicycle with a bicyclist using a hydration pack to access hydration fluids while riding a bicycle.

Referring to FIG. 4, the novel tube 204 routing of this invention takes advantage of the cyclist 400 to bicycle 100 fit relationship of seat post 112 and top tube 118 lengths to rider size. The result is an approximate automatic self-fit for the installed tube 204 length to cyclist 400. To further elucidate this point, taller people will tend to ride bicycles having longer seat posts and top tubes, and so they will have a longer installed tube 204 length, which they require in order to allow the bite valve 208 to comfortably reach their mouth. Routing of the tube 204 up and then back down the seat post 112 can be critical to the function of the apparatus, as the length of tube 204 extending down the front of the seat post 112 to the rear tube reel 300r contributes significantly to the working, or active, length of tube which is required to sufficiently reach up to the cyclists' 400 mouth.

Typical Use

Referring to FIG. 4, a cyclist 400 is shown using a hydration pack 200. The cyclist 400 is able to easily access hydration from the apparatus when desired by grasping the end of the hydration tube 204 with one hand and directing the bite valve 208 into the mouth, where it is then held and controlled indefinitely between the riders' upper and lower teeth and lips. The cyclist 400 is then free to return the hand used to retrieve the bite valve 208 to the handle bar 110 and to continue riding the bicycle.

Hydration fluid is readily obtained by actuating the bite valve 208 with a biting action and then sucking. Hydration fluid passes from the reservoir 201, through the outlet 203, through the tube 204, through the bite valve body 209, through the bite valve 208, and into the cyclists' 400 mouth. The negative static head pressure and dynamic fluidic losses encountered in the fluidic path between the reservoir 201 and cyclists' 400 mouth are easily overcome by the suction force applied by the cyclist 400. The cyclist 400 can hold the bite valve 208 in their mouth while continuing to breathe as required in between successive gulps of hydration fluid from the apparatus.

The displacement imparted to the bite valve 208 and tube 204 while in use causes the tube clip 310 to extend away from the reel assembly 301 on a tensioned string 305. When the cyclist 400 has satisfied their desired level of hydration, he or she need merely release the bite valve 208 from their mouth. The front and rear tube reel assemblies, 300f and 300r, automatically return the tube 204 to the desired position and securely holds it there. For a smooth return, the cyclist may guide the bite valve 208 and tube 204 back to the stored position with the brief use of one hand.

The front and rear tube reels 300*f* and 300*r* also provide a significant safety feature over other means of removably attaching the tube 204 to the bicycle 100 where the attachment has no automatic retracting feature. For example hook and loop fasteners may be employed where the hook element is applied to the tube 204 or the bicycle 100 and the loop element is applied to the other. Were a cyclist to inadvertently drop a hydration tube and bite valve that were not equipped with an automatic retracting feature while riding, the tube and bite valve could fall down into the cyclist's legs, feet, and lower parts of the bicycle. This would create a distracting and thus dangerous situation.

Referring to FIG. 3B, the conical geometry that engages between the tube clip 310 and the reel body/cover 302/304 when in the retracted position acts to resist unwanted lateral motion of the tube clip 310 and tube 204 relative to the securely mounted reel assembly 301. This conical feature also serves as a shield against moisture and contamination ingress to the inner workings of the reel assembly 301.

For fixed volume reservoir 201 embodiments, such as shown in FIGS. 2 and 2E, make-up air is required to replace the volume of fluid that is displaced each time that a user takes a drink. The make-up air check valve 207 allows air to pass from the exterior to the interior of the reservoir 201 without allowing hydration fluids to escape from the interior to the exterior of the reservoir 201. The make-up air check valve 207 can be located on the fill cap 206 or directly on the reservoir 201.

Referring to FIG. 4, a cyclist 400 while descending steep terrain normally slides back off of the seat 114 to shift his or her weight and thus the overall center of gravity rearward. This shifting of center of gravity helps prevent the bicycle from flipping over forward and the rider from going over the handlebars of the bicycle in a crash. The general embodiment given for the invention, by virtue of its mounted location behind and below the seat 114, is designed with this point in mind. The means of hydration pack to bicycle attachment takes into consideration the possibility of additional force input from a rider contacting it, and the shape of the hydration pack and accessories mounted to it are unoffending to a cyclist where contact would be made between the two under these circumstances.

The competent cyclist 400 has no trouble safely performing the simple hand-to-mouth task of accessing the bite valve 208 to obtain hydration while continuing to ride the bicycle 100. This point can be illustrated by comparison and contrast to the commonly performed action of accessing a frame mounted water bottle whereby a cyclist reaches far down the bicycle frame to access a conventional water bottle location, grasping a water bottle, lifting and inverting the bottle to a position that is higher than the riders mouth, while simultaneously tilting ones head back to receive and contain the hydration fluid, all while continuing to ride the bicycle 100 with only one hand. Returning a conventional water bottle to a frame mounted cage also requires careful attention and coordinated effort from a cyclist. A further advantage arises from the fact that the bite valve body 209, bite valve 208 and tube 204 are much smaller, lighter, and ergonomically easier to handle than a typical cage mounted water bottle. The novel arrangement of the invention and it's mode of use clearly affords improved ease of use over the traditional hand held water bottle, resulting in improved hydration performance and safety for the cyclist 400.

The significant burden of carrying adequate hydration fluids, nutritional supplements, and cycling accessories is born directly by the bicycle. The cyclist 400 who is freed from the burden of a back pack or waist pack/belt apparatus will realize improved comfort and a performance benefit from more effective cooling in the otherwise covered and insulated areas of their body.

Further, note the advantage that the rigid mount to seat 114 and seat post 112 will not eject the hydration supply from the bicycle, even under extreme accelerations, as can occur with the bicycle frame mounted cage and bottle system.

Alternative Embodiments

Description and Operation

Referring to FIG. 1, the front tube reel 300*f* is shown attached to the bicycle 100 on the head tube 120, however the front tube reel 300*f* may be attached to any of the top tube 118, down tube 122, stem 111, handlebar 110, or at a junction of any of these elements. Similarly, the rear tube reel 300*r* may be attached to the bicycle 100 on any of the seat post 112, seat tube 116, seat stay 124, top tube 118, or at a junction of any of these elements.

Again referring to FIG. 1, alternative tube 204 routings may be employed as necessary to accommodate the wide variations in bicycle and component design represented in the installed base of bicycles world wide. For example, the tube 204 may be routed from the reservoir 201 up and back down seat post 112, but not through the seat 114. This arrangement may be advantageous in circumstances where there is limited access to the interior of the seat 114 or for seats with non-standard seat rail 115 configurations. The tube 204 can be oriented to any side of the seat post 112 as it is routed from the outlet 203 to the top tube 118. For some installations adequate operating tube 204 length may be achieved without routing the tube 204 up through the seat 114, and in such cases the tube 204 may be routed directly forward or down from the outlet 203 to the most practical configuration.

The general embodiment of FIG. 1 can also be configured to omit the bite valve body 209, such that the bite valve 208 is fitted directly onto the tube 204.

Referring to FIG. 2E, an alternative embodiment of a reservoir assembly is shown where a semi-rigid reservoir A 201A includes a pocket recess 235 feature and a stabilizing protrusion 236 feature. The reservoir A 201A is blow molded from a durable food grade plastic, for example HDPE. The pocket recess 235 provides an inconspicuous area for a pocket feature to be integrated on a complementary pack shell. The shape, size, and location of the pocket recess 235 feature can vary from the embodiment shown, as required to satisfy different product design objectives. The stabilizing protrusion 236 feature provides an alternative means to the wedge pad 210*c* of FIG. 2D for stabilizing the reservoir assembly against the seat rails 115 of FIG. 1. An outlet A 203A is integrally molded as part of the reservoir A. A fill cap A 206A is fitted to a fill port A 205A by way of threaded engagement. A leash 232, having two ends, fits over the fill port 205A on one end and is secured to the fill cap A 206A with a leash pin 233 on the other end. The leash pin 233 is welded to the fill cap A 206A. The leash 232 acts to allow the fill cap A 206A to be retained in close proximity to the reservoir A 201A when removed from the fill port A 205A for filling or cleaning. A check disc 207A is captured between the fill cap A 206A and the leash pin 233. The check disc 207A is made from a flexible and resilient food grade material such as Viton® rubber. A seat post block 234 is welded to the reservoir A 201A. The seat post block 234 is injection molded from a similar material as the reservoir A 201A, for example HDPE, to facilitate welding. The seat post block includes a tube hole 234A feature, a strap slot 234B feature, and an arched V channel 234C feature. The tube hole 234A acts as a passage way through which the tube 204, common to the embodiment of FIG. 1, is routed. The strap slot 234B accepts a hook and loop strap assembly to secure the reservoir assembly to the seat post 112. The arched V channel 234C directly engages the seat post 112, with the "V" geometry acting to resist lateral motion and the "arched" geometry acting to accommodate variations in installation.

Referring to FIG. 2F, a detailed cross section view of a lid assembly is shown. The leash pin 233 includes a leash pin vent hole 233A feature located on its axis and a concave leash pin vent face 233B feature located on its underside. The fill cap A 206A includes a fill cap vent hole 206B feature located on its axis and a convex fill cap vent feature 206C surrounding the fill cap vent hole 206A. The check disc 207A is forced into an inverted cupped shape when assembled between the fill cap A 206A and the leash pin 233. A seal is created between the check disc 207A and the leash pin vent face 233B, preventing fluid from passing out past the check disc 207A. The check disc 207A is flexible and allows make-up air to enter in past the seal created with the leash pin vent face 233B when fluid is depleted from the reservoir A 201A from FIG. 2E.

Figure 3C:
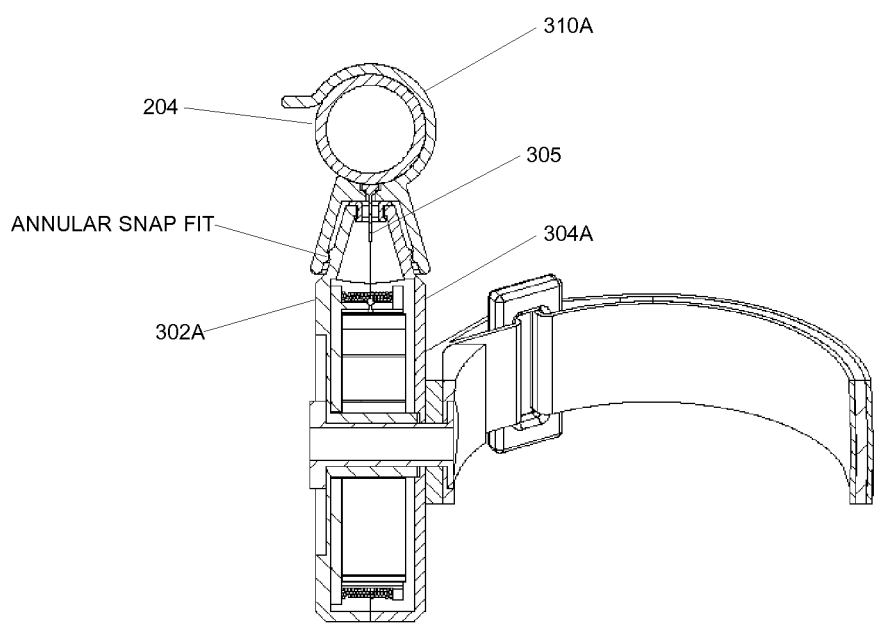
FIG. 3C shows a cross sectional view of a tube reel assembly.

Referring to FIG. 3C, a cross section view of a tube reel assembly is shown where an annular snap fit is established between a tube clip A 310A and a reel body A 302A and a reel cover A 304A. The user manually engages the snap fit feature by pressing the tube clip A 310A down, forcing engagement with the reel body A 302A and reel cover A 304A. The snap fit feature serves to supplement the string 305 tension holding force exerted on the tube clip A 310A, thus holding the tube 204 more securely in place.

Figure 3D:
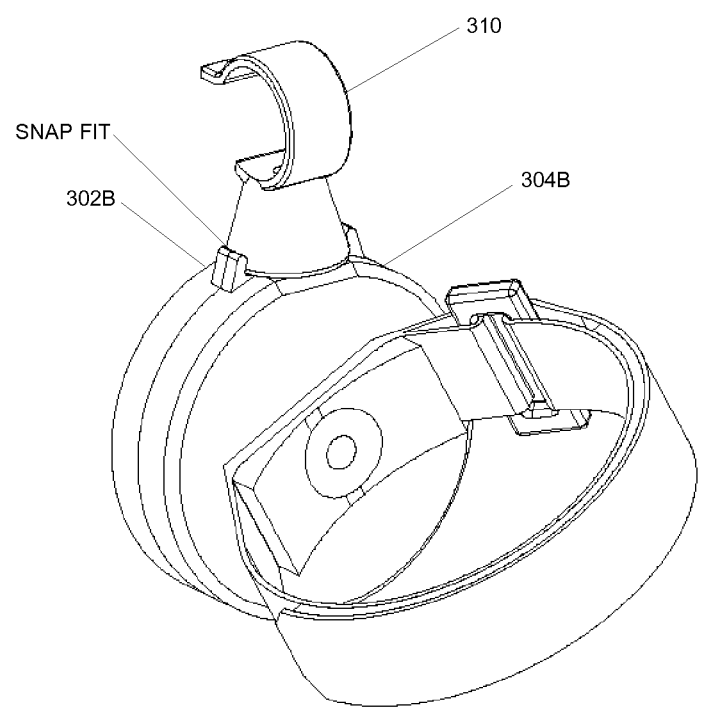
FIG. 3D shows a perspective view of an alternative embodiment of a tube reel assembly employing a snap fitting feature to further secure the tube.

Referring to FIG. 3D, a perspective view of a tube reel assembly is shown where a snap fit is established between the tube clip 310 and a reel body B 302B and a reel cover B 304B. The user manually engages the snap fit feature by pressing the tube clip 310 down, forcing engagement with snap fit features on the reel body B 302B and reel cover B 304B. The snap fit feature serves to supplement the holding force exerted on the tube clip 310 while in the stored position.

Figure 3E:
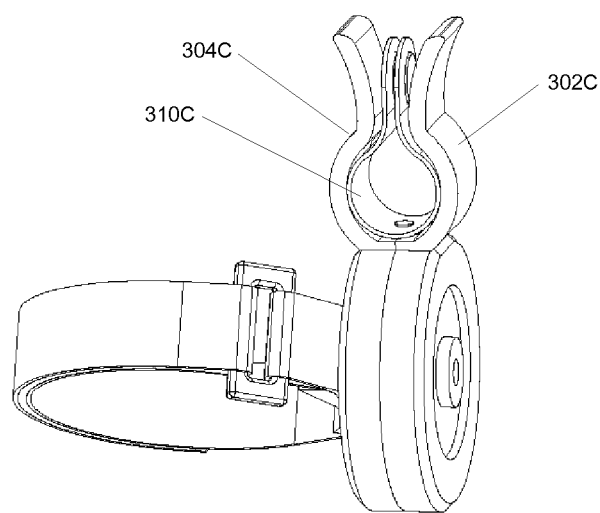
FIG. 3E shows a perspective view of an alternative embodiment of a tube reel assembly employing a fixed clasp to secure the tube.
Figure 3F:
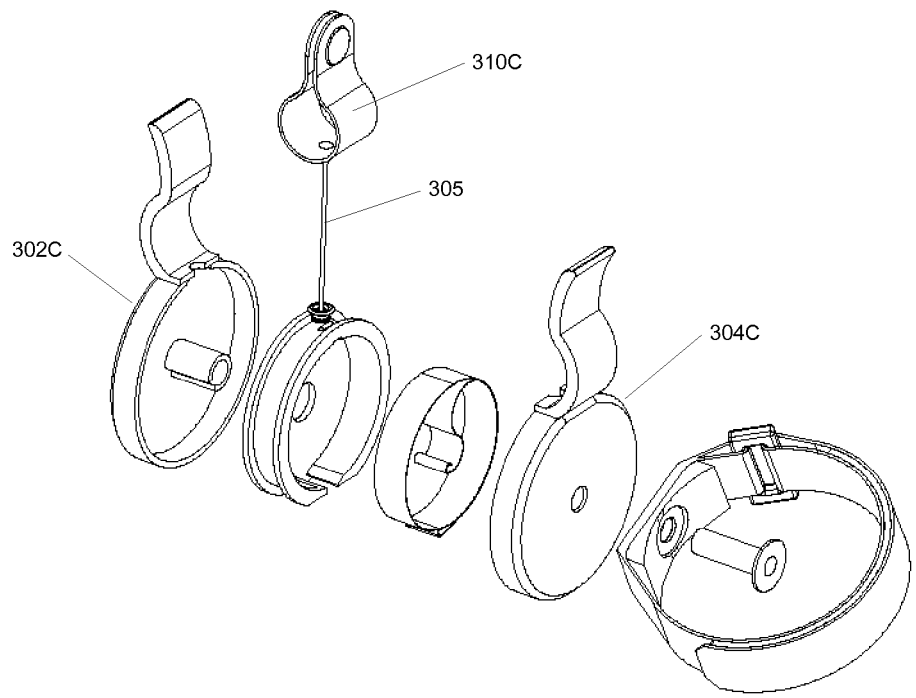
FIG. 3F shows an exploded perspective view of the tube reel assembly from FIG. 3E.

Referring to FIGS. 3E and 3F, a perspective and exploded view of a tube reel assembly are shown respectively, where a clasp fit is established between the tube clip C 310C and a reel body C 302C and a reel cover C 304C. The user manually engages the clasp fit feature by pressing the tube clip C 310C down, forcing engagement with clasp fit features on the reel body C 302C and reel cover C 304C. The clasp fit feature serves to supplement the holding force exerted on the tube clip 310C while in the stored position.

Figure 3G:
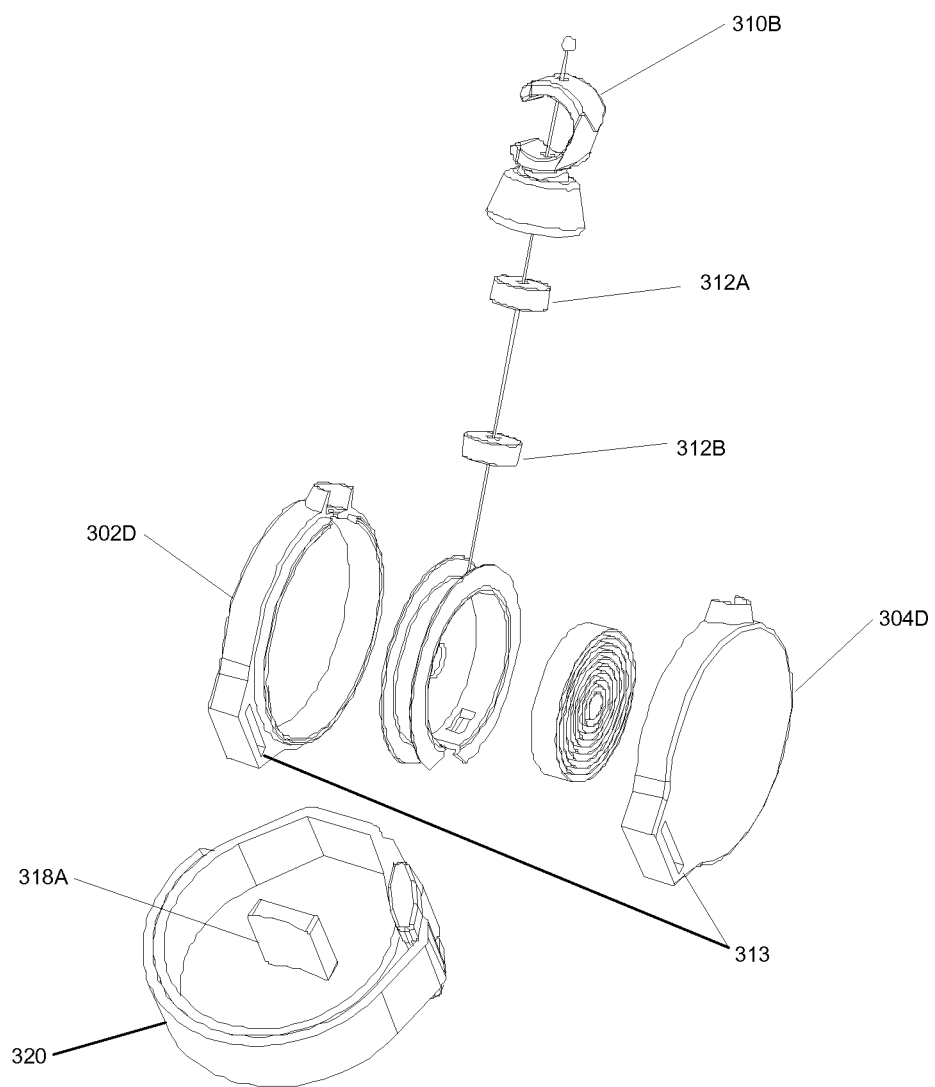
FIG. 3G shows an exploded perspective view of an alternative embodiment of a tube reel assembly employing center mounting strap assembly and a magnet set to further secure the tube.

Referring to FIG. 3G, an exploded view of a tube reel assembly is shown where a set of magnets 312A and 312B are employed. Magnet A 312A is permanently attached into a pocket in the tube clip B 310B. Magnet B 312B is permanently attached into a pocket formed between the reel body D 302D and the reel cover D 304D. The magnet set 312A and 312B serves to supplement the holding force exerted on the tube clip B 310B while in the stored position.

FIG. 3G also shows an alternate strap mounting configuration that allows a reel assembly to be mounted to an element on a bicycle along its circumferential face. The strap 320 passes through a slot 313 in the reel body 302D and reel cover 304D. A strap pad A 318A is permanently fixed to the reel body 302D and reel cover 304D, providing compliance between the reel assembly and the element on the bicycle to which it is mounted.

Figure 3H:
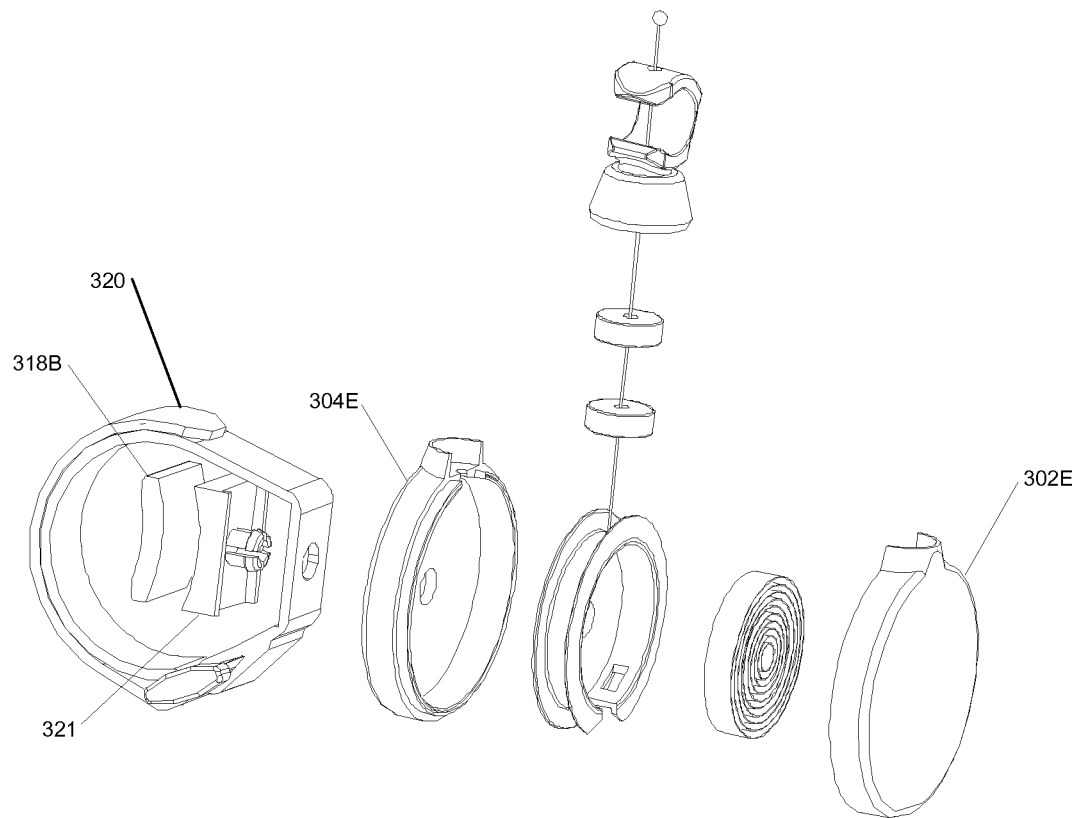
FIG. 3H shows an exploded perspective view of an alternative embodiment of a tube reel assembly employing a side mounting strap assembly.

Referring to FIG. 3H, an exploded view of a tube reel assembly is shown where a strap bracket 321 snap fit attaches to a receiving hole in a reel cover E 304E. The strap 320 is captured between the strap bracket 321 and the reel cover E 304E. A complementary reel body E 302E attaches to the reel cover E 304E. A strap pad B 318B is permanently attached to the strap bracket 321, providing compliance between the reel assembly and the element to which it is mounted.

Figure 3I:
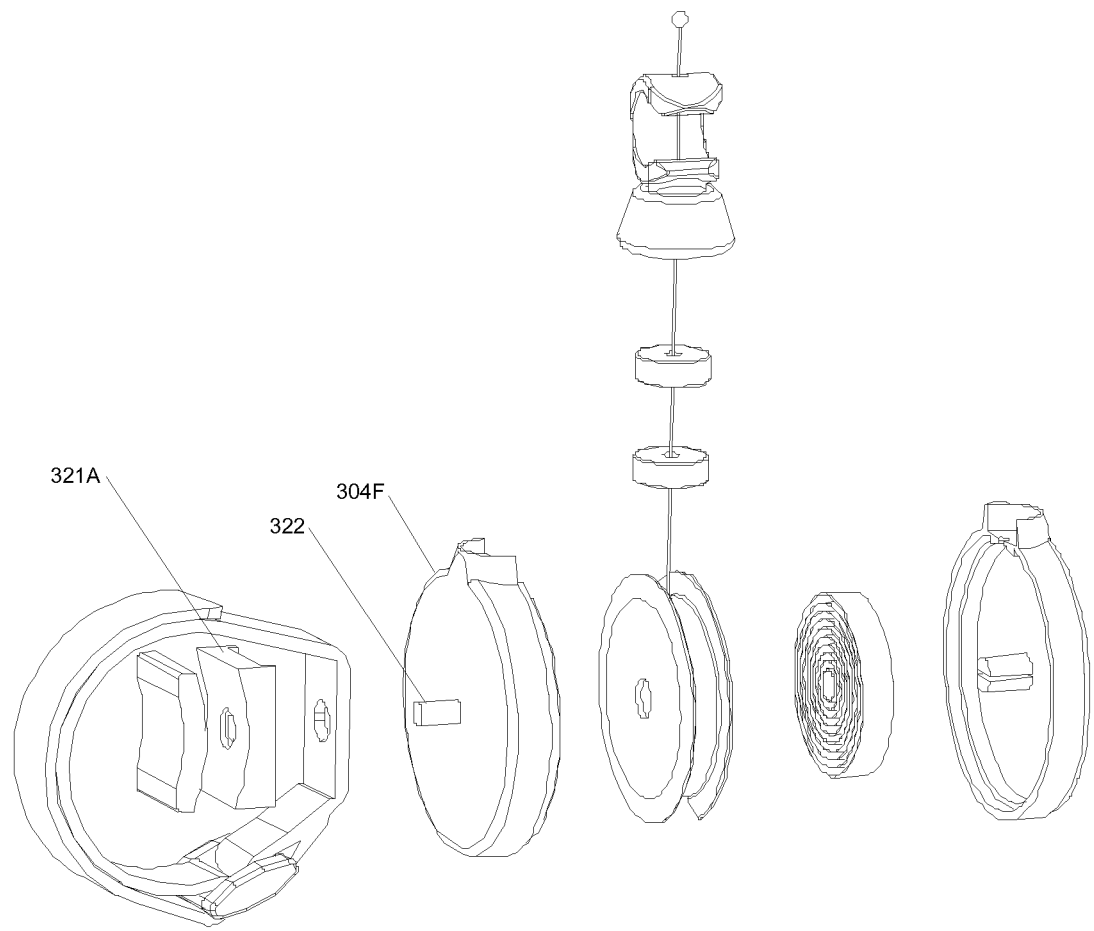
FIG. 3I shows an exploded perspective view of an alternative embodiment of a tube reel assembly employing an alternative side mounting strap assembly.

Referring to FIG. 3I, an exploded view of a tube reel assembly is shown where a strap bracket A 321A is assembled to a reel cover F 304F by way of placing it over a post 322 that is molded as part of the cover F 304F. The tip of the post 322 is then formed over the strap bracket A 321A securing it in place while still allowing for rotation of the strap assembly relative to the reel assembly.

Figure 9:
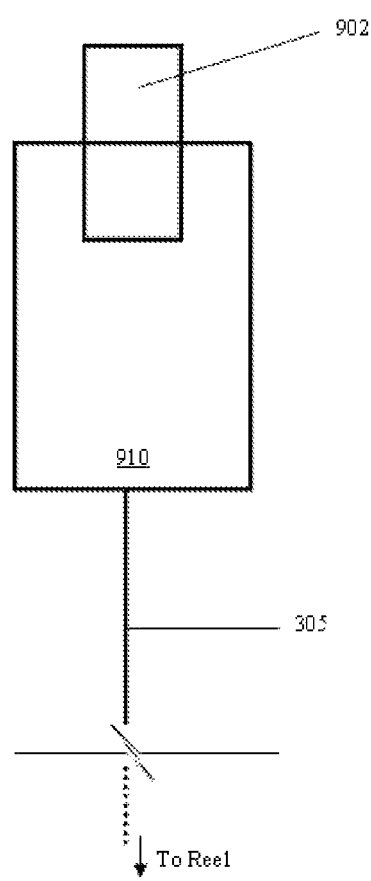
FIG. 9 shows an accessory coupler configured to couple an accessory to a line of a reel apparatus.

A bicycle mounted retracting reel assembly can alternatively be used to retain and secure accessory items 902 (FIG. 9) other than a flexible hydration tube, for example an employment badge or a nutrition dispensing device, such that the accessory 902 is automatically guided back to and securely held in a stored location.

The tube reel assembly embodiments and the related means of securing a hydration tube in a retracted position may be applied to other applications, in addition to the bicycling applications that have been described. For example, other vehicles such as ORV's, ATV's, Race Cars, Motorcycles, Recreational, Commercial, and Industrial vehicles, and Farm Equipment may benefit from the application of the tube reel assembly to a respective resident hydration system that utilizes a flexible tube to deliver hydration fluid.

Figure 5:
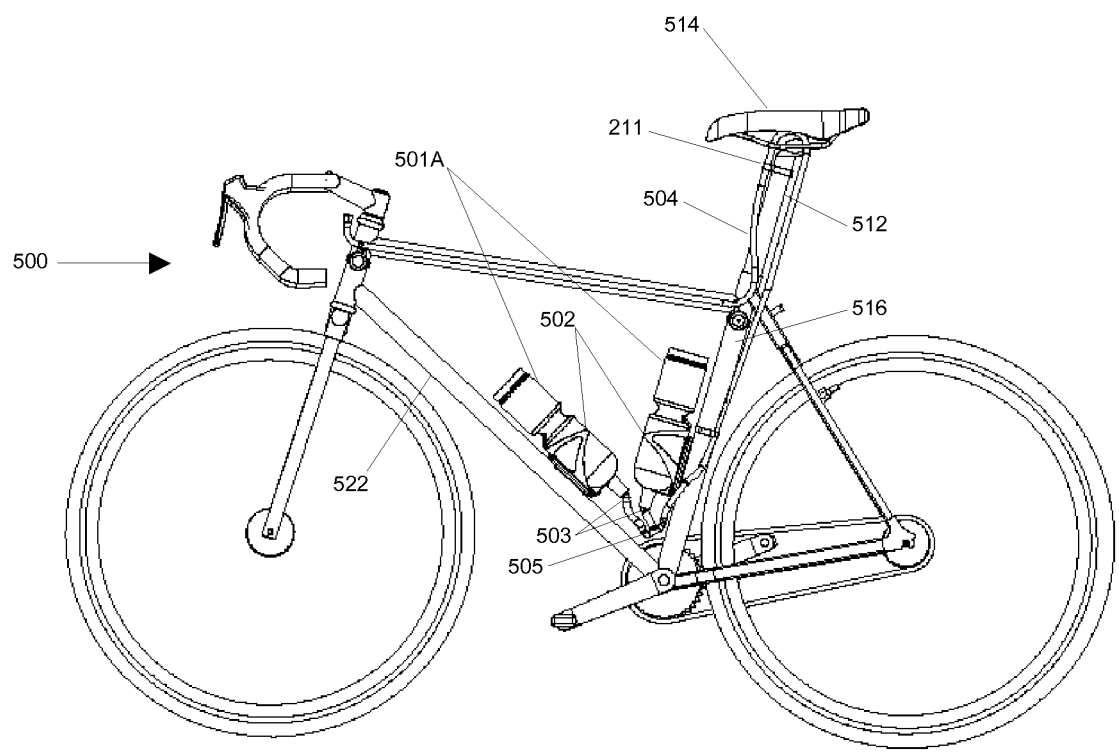
FIG. 5 shows a side view of an alternative hydration pack embodiment where the reservoir is removably attached to a bicycle frame at various standard water bottle cage mounting locations.

Referring to FIG. 5, a side view is shown of an alternative hydration pack embodiment where a bottle5 assembly 501A is removably attached to a bicycle5 500 frame at various standard water bottle cage mounting locations, for example on a seat tube5 516 or a down tube5 522. The unique elements of the apparatus include a bottle5 assembly 501A, a res5 bracket 502, an outlet5 503, a tube5 504, an optional T 505, and a make/break fluidic interface between the bottle5 assembly 501A and the res5 bracket 502. The res5 bracket 502 is attached to the bicycle5 500 with two M5 screws. The bottle5 assembly 501A is removably held in the res5 bracket 502. The tube5 504 is routed from the outlet5 503, to a seat tube5 516, and up to the bottom side of a seat5 514. The tube5 504 is removably attached with one or a plurality of tube straps 211 to the down tube5 522 and/or the seat tube5 516 and/or seat post5 512, as required to secure the tube5 504 in the desired position. Tube5 504 routing is the same as that described for the generic embodiment from this point on. For multiple bottle5 assembly 501A installations a T 505 is installed for each additional bottle5 assembly 501A, combining the respective tube5's 504 into one outgoing tube5 504.

Figure 5A:
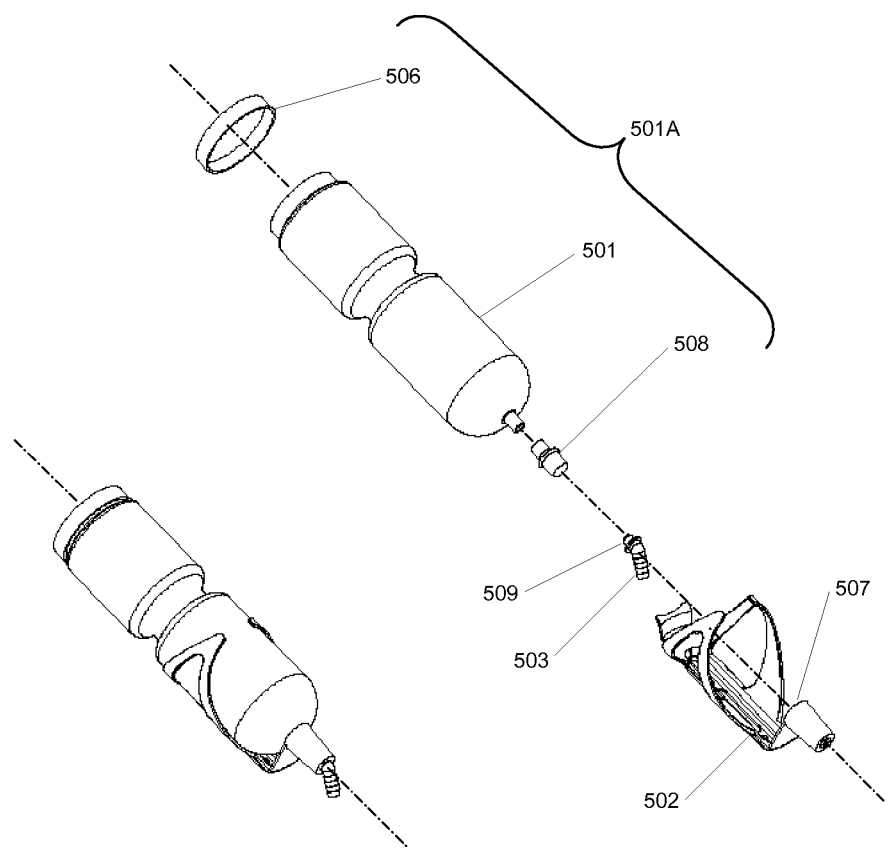
FIG. 5A shows an exploded perspective view of the hydration pack from FIG. 5, detailing a make/break fluidic interface between the reservoir outlet and the reservoir bracket.

Referring to FIG. 5A, an exploded perspective view is shown of the alternative hydration pack assembly and the make/break fluidic interface between the reservoir5 501 and the res5 bracket 502. The make/break fluidic interface is comprised of a receiving socket 507, a valve 508, and an annular seal 509. The valve 508 is fabricated from a supple and resilient polymer, such as silicone rubber. The valve 508 fits into the socket 507 as the bottle 501 is inserted into the res5 bracket 502. The annular seal 509 engages the internal circumference of the socket 507 causing the annular seal 509 to compress, thus forming a seal around the exterior of the fluidic interface. Simultaneously the valve 508 opens by way of an interference fit with a feature in the socket 507, allowing hydration fluid to flow from the reservor5 501 to the outlet5 503. Upon removal of the reseroir5 501 from the res3 bracket 502 the valve 508 automatically closes.

Operation of the apparatus to retrieve hydration fluids is the same as that described for the generic embodiment.

This embodiment entails a res5 bracket 502 design that is compatible with the standard water bottle format that is ubiquitously used throughout the bicycling industry. Alternative or unique reservoir sizes and shapes are compatible with the general embodiment.

Numerous alternative means may be employed to achieve a make/brake fluidic interface, for example a face seal may be substituted for the annular ring seal, or a septum and needle may be used.

Figure 5B:
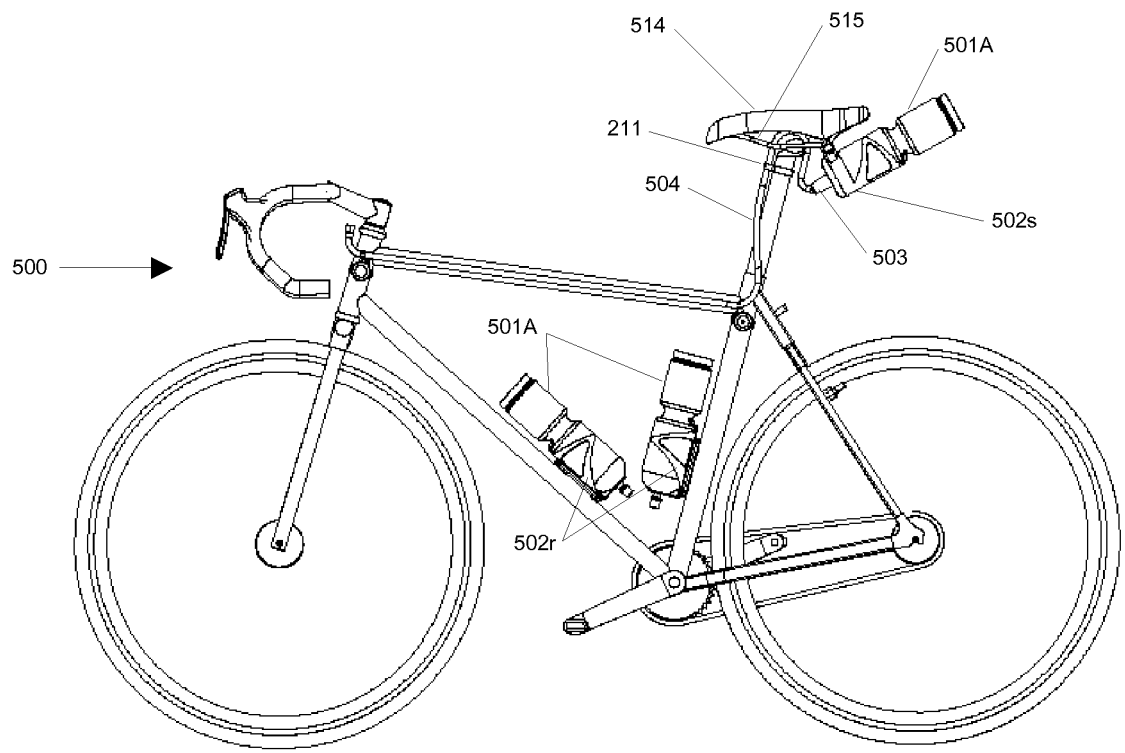
FIG. 5B shows a side view of an alternative hydration pack embodiment where the reservoir is removably attached to a bicycle at the seat rails.

Referring to FIG. 5B, a side view is shown of an alternative hydration pack embodiment where the bottle5 assembly 501A is removably attached to a seat5 514 of a bicycle5 500, and where additional replacement bottle5 assemblies 501A are removably attached to the bicycle5 500 at standard water bottle cage mounting locations. The unique elements of the apparatus beyond that of FIG. 5 include one or more reserve res5 brackets 502r, and a seat res5 bracket 502s. Each reserve res5 bracket 502r is attached to the bicycle5 500 with two M5 screws at standard bottle cage mounting locations on a bicycle. The seat res5 bracket 502s attaches to the seat rails5 515 of seat5 514. The bottle5 assembly 501A is removably held in the seat res5 bracket 502s. The tube5 504 is routed from the outlet5 503 in the same fashion as that described for the general embodiment. A full bottle5 assembly 501A from a reserve res5 bracket 502r location can be exchanged with a bottle5 assembly 501A that has been depleted of hydration fluid from use.

Figure 5C:
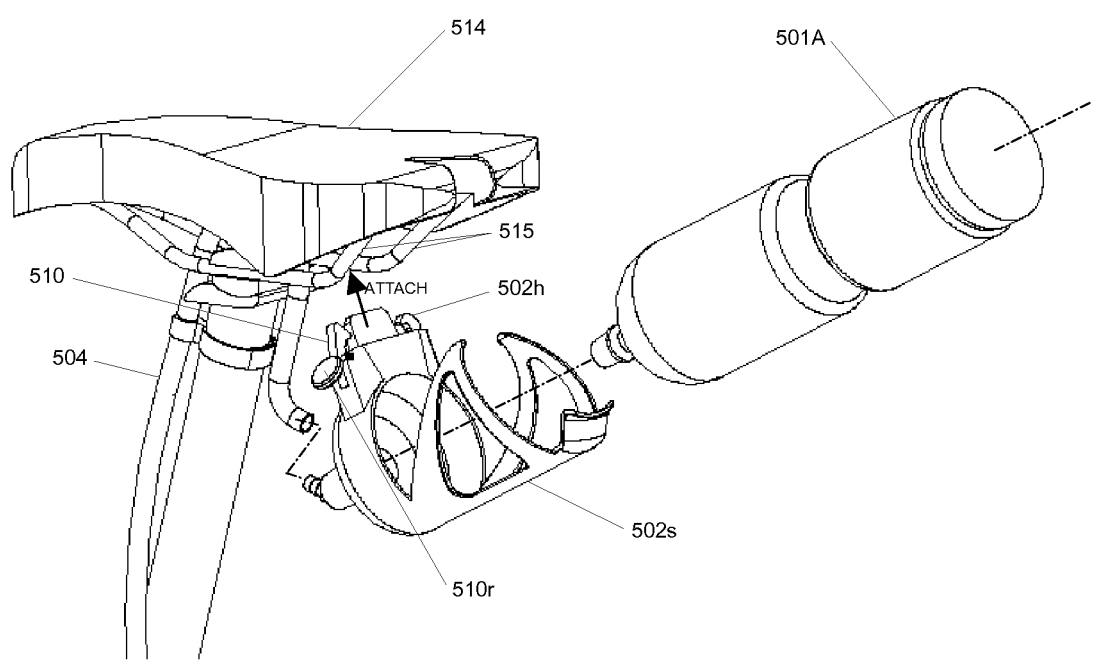
FIG. 5C shows an exploded view of the hydration pack from FIG. 5B, detailing a hook and spring latch apparatus for attaching the reservoir bracket to the rails on a bicycle seat.

Referring to FIG. 5C, an exploded perspective view of the apparatus of FIG. 5B is shown describing a means for attaching the apparatus to a bicycle seat5 514 having seat rails5 515. The apparatus is attached to the seat5 514 by way of a fixed hook 502h feature on the seat res5 bracket 502s and a spring actuated latch arm 510 that engage the seat rails5 515. The apparatus is detached from the seat5 514 by pressing on a release button 510r feature on the latch arm 510 to disengage it from the seat rails5 515.

Figure 6:
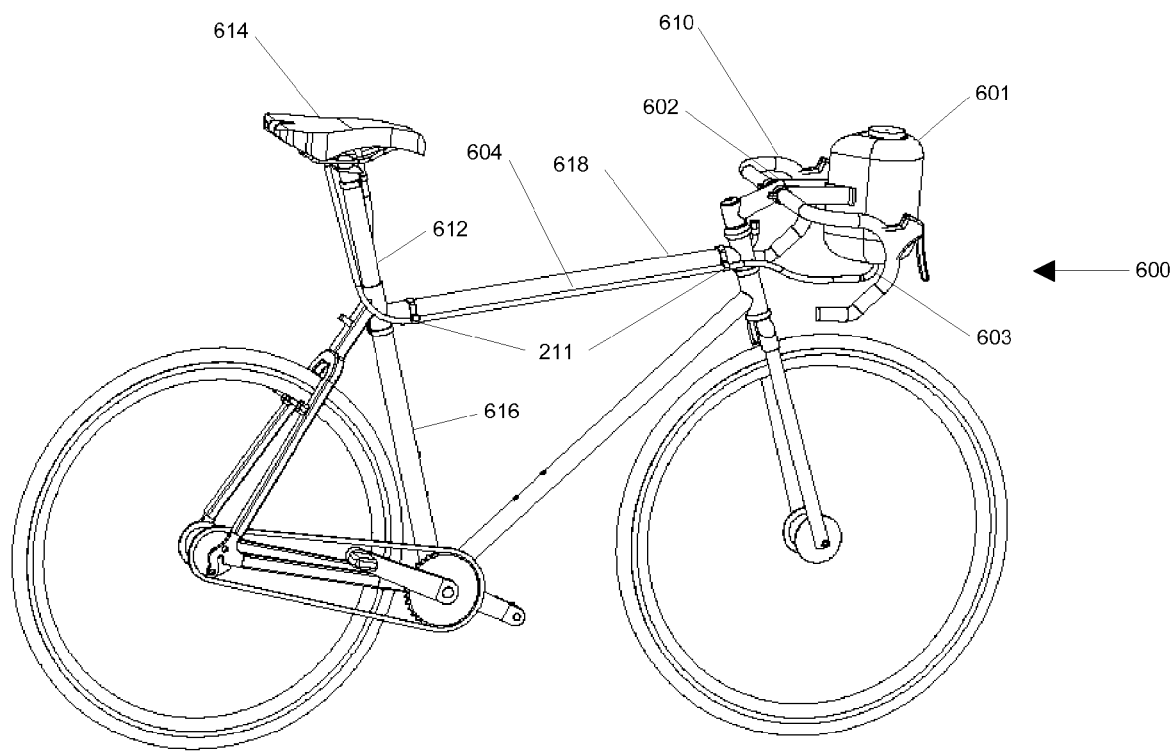
FIG. 6 shows a perspective view of an alternative hydration pack embodiment with an aerodynamic reservoir that is mounted forward of the bicycle handlebars and with complementary tube routing.

Referring to FIG. 6, an alternative hydration pack embodiment is shown with an aerodynamically shaped reservoir6 601 that is attached to the front of a bicycle6 600 and with complementary tube routing. The unique elements of the apparatus include a reservoir6 601, a res6 bracket 602, an outlet6 603, and a tube6 604. The reservoir6 601 is removably attached forward of and to a handlebar6 610 with the res6 bracket 602. The tube6 604 connects to the outlet6 603, and is routed back along a top tube6 618 to a seat tube6 616, and up a seat post6 612 to the rearward bottom side of a seat6 614. Tube6 604 routing is the same as that described for the generic embodiment from this point on. The tube6 604 is removably attached with one or a plurality of tube straps 211 to the top tube6 618 and/or the seat tube6 616 and/or seat post6 612, as required to secure the tube6 604 in the desired position. The reservoir6 601 may be alternatively designed to integrate with an aero-style handlebar.

Operation of the apparatus to retrieve hydration fluids is the same as that described for the generic embodiment.

Figure 7:
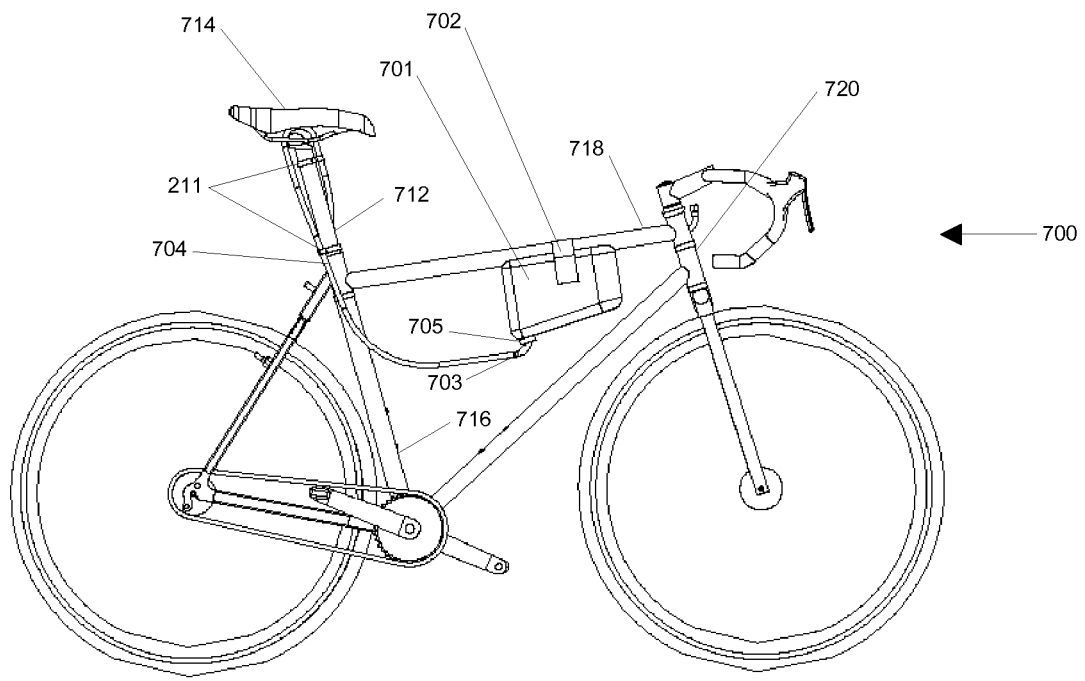
FIG. 7 shows a side view of an alternative hydration pack embodiment with an aerodynamic reservoir that is attached behind the head tube of a bicycle and with complementary tube routing.

Referring to FIG. 7, an alternative hydration pack embodiment is shown with a reservoir7 701 that is attached behind the head tube7 720 of a bicycle7 700 and with complementary tube routing. The unique elements of the apparatus include a reservoir7 701, a res7 strap 702, an outlet7 703, a tube7 704, and a fill port 705. The reservoir7 701 is removably attached to the top tube7 718 with the res7 strap 702. The outlet7 703 threads onto the fill port 705. The tube7 704 connects to the outlet7 703, and is routed back to a seat tube7 716, and up a seat post7 712 to the rearward bottom side of a seat7 714. The tube7 704 is removably attached with one or a plurality of tube straps 211 to the top tube7 718 and/or the seat tube7 716 and/or seat post7 712, as required to secure the tube7 704 in the desired position. Tube7 704 routing is the same as that described for the generic embodiment from this point on.

Operation of the apparatus to retrieve hydration fluids is the same as that described for the generic embodiment.

Figure 8:
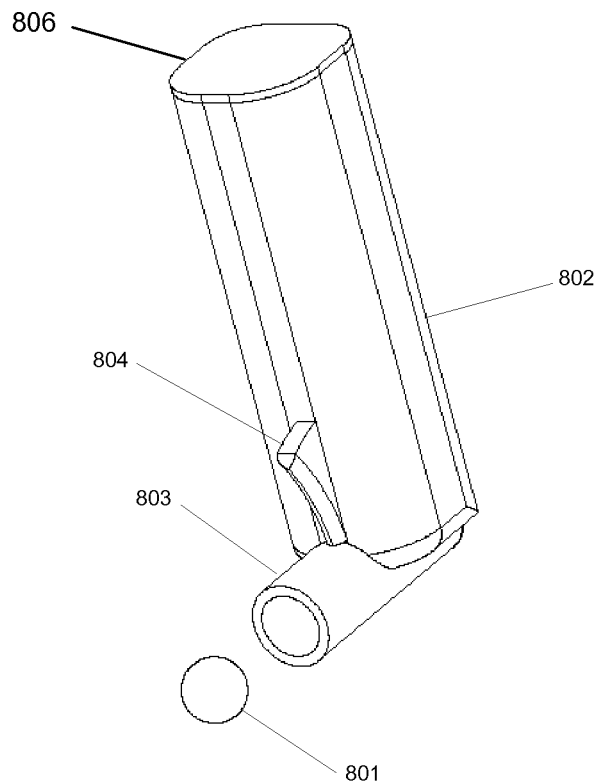
FIG. 8 shows a perspective view of a nutrition dispensing apparatus.

FIG. 8 shows a perspective view of a general embodiment of a nutrition dispensing apparatus and a nutrition element. The apparatus is comprised of a body 802, a barrel 803, a trigger 804, and a fill cover 806. A plurality of spherical nutrition elements 801 are loaded into the body 802 through the hinged fill cover 806. A user retrieves nutrition by actuating the trigger 804, which causes an individual nutrition element 801 to eject from the barrel 803. The actual size and shape of the apparatus will vary depending on various applications, ergonomic considerations, and user needs. While this apparatus has been conceived of with a bicycling application in mind, it has been contemplated that it may be beneficial to persons engaging in other modes of use, for example running, skiing, and other recreational pursuits.

Alternative Reservoir, Pack, and Attachment Embodiments

A bladder type reservoir may be substituted for the rigid bottle reservoir. In this case, a pack with an internal reinforcing panel is employed in order to secure the bladder and it's contents during passage. The pack has a smooth interior without any sharp or excessively protruding features to protect against abrasion and/or punctures to the hydration bladder.

An alternative hydration pack embodiment may be attached to a conventional bicycle seat 114 and/or seat post 112 by way of numerous releasably engaged strap or latching mechanisms. For example any of the mechanisms developed for releasably attaching a cyclists' shoe to a bicycle pedal may be employed, such that the alternative hydration pack is clipped into a spring latching mechanism that is attached to the seat 114 and is subsequently released with a rotating motion. Or, the alternative hydration pack may hook directly on and latch to the seat rails 115 without the use of a seat strap assembly 210.

The tube 204 may be manufactured from a range of commercially available materials suitable for food grade dispensing, for example polyethylene lined PVC or polyurethane. Polyurethane tubing can be manufactured to assume a pre-defined shape by holding the tube in the desired shape while heating it to the materials glass transition temperature and then cooling it. The tube 204 can therefore be specified to assume a shape complementary to this invention, providing for an improved fit on the bicycle 100 over non-preformed embodiments.

There are numerous alternative design variations which enable adjustability of fit between the hydration pack 200 and the bicycle 100. For example, the seat post strap assembly 214 may employ a different method of adjusting the seat post strap 215 length to accommodate varying seat post 114 diameters, or a clamping mechanism may be used to attach to the seat post 114. Likewise, a basic fabric strap with any common fastening means can be used to adjustably fit the apparatus to a wide range of actual seat and seat post combinations.

A hydration pack may employ a reservoir with an outlet positioned other than at the lowest location on the reservoir, where a tube extends from the interior side of the outlet to the lowest location on the interior of the reservoir.

Evolution of a more completely integrated seat, seat post, hydration, nutrition, and cargo system is a natural extension of the underlying concept behind this invention. For example; a bicycle seat frame and hydration reservoir body can be molded as one continuous part, or a bicycle seat frame can be formed so as to integrate a nutrition dispensing device that is easily accessible by a bicyclist.

Conclusion, Ramifications, and Scope

This invention provides a useful and novel apparatus which is capable of simultaneously satisfying a bicyclists needs for hydration, nutrition, and safe passage of various auxiliary and accessory items.

While the description contains much specificity, these should not be construed as limitations on the scope of the invention, but as exemplifications of the presently preferred embodiments thereof. Many other ramifications and variations are possible within the teachings of the invention. Thus the scope of the invention should be determined by the appended claims and their legal equivalents, and not by the examples given.

The invention claimed is:

1. A retractable reel apparatus comprising:
   a housing defining an aperture and including a spring actuated assembly;
   a line coupled to the spring actuated assembly such that the line is resiliently extensible from and automatically retractable to the housing;
   an accessory coupler affixed to the line and being configured to couple an accessory to the line such that a tension in the line can urge the accessory coupler toward the housing and can apply a holding force longitudinally of the line to the accessory coupler when the accessory coupler is positioned adjacent the housing; and
   a retainer configured to supplement the holding force longitudinally of the line when the accessory coupler is positioned adjacent the housing; wherein the retainer comprises a snap-fit feature on the accessory coupler and a corresponding snap-fit feature on the housing, or a clasp-fit feature on the accessory coupler and a corresponding clasp-fit feature on the housing.

2. The retractable reel assembly of claim 1, wherein said accessory comprises one or more of a flexible tube, one or more tools, one or more spare parts, a cellular phone, one or more articles of clothing, a badge, a clip and one or more nutritional supplements.

3. The retractable reel apparatus of claim 1, said housing being removably coupleable to a bicycle in front of a handlebar and/or to a top tube.

4. The retractable reel apparatus of claim 1, further comprising a side mounting strap assembly having a strap with hook and loop fasteners, and a D-ring, wherein the strap has a first end being permanently attached to said D-ring and a second end configured to wrap around a member of a bicycle, to pass through the D-ring, and to loop back onto a portion of the strap positioned between the first end and the second end, securing said reel assembly to said bicycle.

5. The retractable reel apparatus of claim 4 wherein said strap assembly further comprises a strap bracket configured to secure to the housing.

6. The retractable reel apparatus of claim 1, wherein the retainer is configured to provide a magnetic force to supplement the holding force.

7. The retractable reel apparatus of claim 6, wherein the retainer comprises a first magnet fixedly positioned relative to the accessory coupler and a second magnet fixedly positioned relative to the housing, wherein a magnetic force between the first magnet and the second magnet urges the accessory coupler toward the housing.

8. The retractable reel apparatus of claim 7, wherein the first magnet is received in a pocket formed by the accessory coupler.

9. The retractable reel apparatus of claim 7, wherein the second magnet is received in a pocket formed by the housing.

10. The retractable reel apparatus of claim 1, wherein the accessory coupler comprises a tube clip.

11. The retractable reel assembly of claim 10, wherein the tube clip is configured to support a flexible tube extending from a hydration apparatus.

12. The retractable reel apparatus of claim 1, wherein a portion of the accessory coupler is configured to matingly engage a portion of the housing when the line is retracted.

13. The retractable reel apparatus of claim 12, wherein a mating engagement of the accessory coupler and housing resists relative lateral movement between the accessory coupler and the housing.

14. The retractable reel apparatus of claim 11, further comprising the flexible tube, wherein the tube clip supports a portion of the flexible tube, and the flexible tube is configured to extend from and fluidicly couple to an outlet of a reservoir of a hydration apparatus.

15. The retractable reel assembly of claim 14, wherein said flexible tube is configured to be routed along a portion of a vehicle from said outlet of the reservoir to the tube clip.

16. The retractable reel apparatus of claim 14, further comprising the reservoir, wherein the flexible tube extends from and fluidicly couples to the reservoir.

17. A retractable reel apparatus comprising:
    a housing defining an aperture;
    a rotatable spool positioned within the housing and configured to receive a circumferentially wound line;
    an accessory coupler configured to couple to an accessory;
    a line configured to circumferentially wind about, and to couple the accessory coupler to, the rotatable spool, wherein the line extends through the aperture defined by the housing;
    a biasing member configured to apply a continuous biasing force to the spool such that the line automatically urges the accessory coupler toward a retracted position adjacent the housing and applies a holding force to the accessory coupler in a direction generally parallel to the line when the accessory coupler is in the retracted position;
    a retainer configured to supplement the holding force in a direction generally parallel to the line when the accessory coupler is in the retracted position; wherein the retainer comprises a snap-fit feature on the accessory coupler and a corresponding snap-fit feature on the housing, or a clasp-fit feature on the accessory coupler and a corresponding clasp-fit feature on the housing.

18. The apparatus of claim 17, wherein the retainer comprises a magnetic element configured to magnetically urge the accessory coupler toward the housing in a direction generally parallel to the line.

19. A method of retaining an accessory, comprising:
    coupling a housing of a retractable reel apparatus to a vehicle, wherein the retractable reel apparatus comprises a resiliently extensible line extending through an aperture in the housing and an accessory coupler affixed to the line, wherein the resiliently extensible line is configured to urge the accessory coupler toward the housing and to apply a holding force to the accessory coupler when the accessory coupler is positioned adjacent the housing;
    coupling the accessory to the accessory coupler; and supplementing with a snap-fit arrangement or a clasp-fit arrangement the holding force applied to the accessory coupler by the line in a direction substantially parallel to the line.

20. The method of claim 19, wherein the accessory comprises a hydration tube.

\* \* \* \* \*